(12) United States Patent
Bohnert et al.

(10) Patent No.: US 11,193,534 B2
(45) Date of Patent: Dec. 7, 2021

(54) MULTI-PART ADJUSTING ELEMENT

(71) Applicant: WTO Vermögensverwaltung GmbH, Ohlsbach (DE)

(72) Inventors: Fabian Bohnert, Zell am Harmersbach (DE); Karlheinz Jansen, Schutterwald (DE); Klaus Maier, Ortenberg (DE)

(73) Assignee: WTO Vermögensverwaltung GmbH, Ohlsbach (DE)

( * ) Notice: Subject to any disclaimer, the term of this patent is extended or adjusted under 35 U.S.C. 154(b) by 0 days.

(21) Appl. No.: 16/925,051

(22) Filed: Jul. 9, 2020

(65) Prior Publication Data
US 2021/0048065 A1 Feb. 18, 2021

(30) Foreign Application Priority Data
Aug. 13, 2019 (DE) .................... 10 2019 121 755.5

(51) Int. Cl.
*F16C 25/06* (2006.01)
*F16B 2/02* (2006.01)
*F16B 39/10* (2006.01)

(52) U.S. Cl.
CPC ............. *F16C 25/06* (2013.01); *F16B 2/02* (2013.01); *F16B 39/10* (2013.01); *F16C 2226/60* (2013.01); *F16C 2226/62* (2013.01); *F16C 2226/76* (2013.01); *F16C 2229/00* (2013.01)

(58) Field of Classification Search
CPC .... F16C 19/163; F16C 19/184; F16C 19/364; F16C 19/386; F16C 25/06; F16C 2226/60; F16C 2226/62; F16C 2226/76; F16C 2229/00; F16B 2/02; F16B 39/10; F16B 39/12; F16B 39/24; F16B 43/00
See application file for complete search history.

(56) References Cited

U.S. PATENT DOCUMENTS

| | | | |
|---|---|---|---|
| 1,088,515 A | 2/1914 | Bazin | |
| 2,029,218 A * | 1/1936 | Biesik | B60J 1/001 52/203 |
| 2,318,398 A | 5/1943 | Hungerford | |
| 3,986,750 A * | 10/1976 | Trent | F16B 31/02 301/35.63 |
| 5,094,117 A | 3/1992 | Mikel et al. | |
| 5,533,794 A * | 7/1996 | Faison | B60B 27/00 301/105.1 |
| 5,560,687 A * | 10/1996 | Hagelthorn | B60B 27/001 301/105.1 |
| 6,290,442 B1 * | 9/2001 | Peterkort | F16B 39/10 411/120 |
| 2006/0006731 A1 | 1/2006 | Porter et al. | |
| 2007/0052287 A1 | 3/2007 | White et al. | |
| 2008/0289470 A1 | 11/2008 | Aston | |
| 2010/0266331 A1* | 10/2010 | Peterkort | F16C 43/04 403/26 |

(Continued)

FOREIGN PATENT DOCUMENTS

| | | | | |
|---|---|---|---|---|
| CN | 101963178 A * | 2/2011 | ............ | F16C 19/386 |
| CN | 202431872 U * | 9/2012 | .............. | F16C 25/06 |

(Continued)

*Primary Examiner* — Phillip A Johnson
(74) *Attorney, Agent, or Firm* — Aslan Law, P.C.

(57) ABSTRACT

A multi-part adjusting element is proposed, which makes possible a very precise adjustment of a shaft bearing.

19 Claims, 24 Drawing Sheets

(56) References Cited

U.S. PATENT DOCUMENTS

Figure 1A:
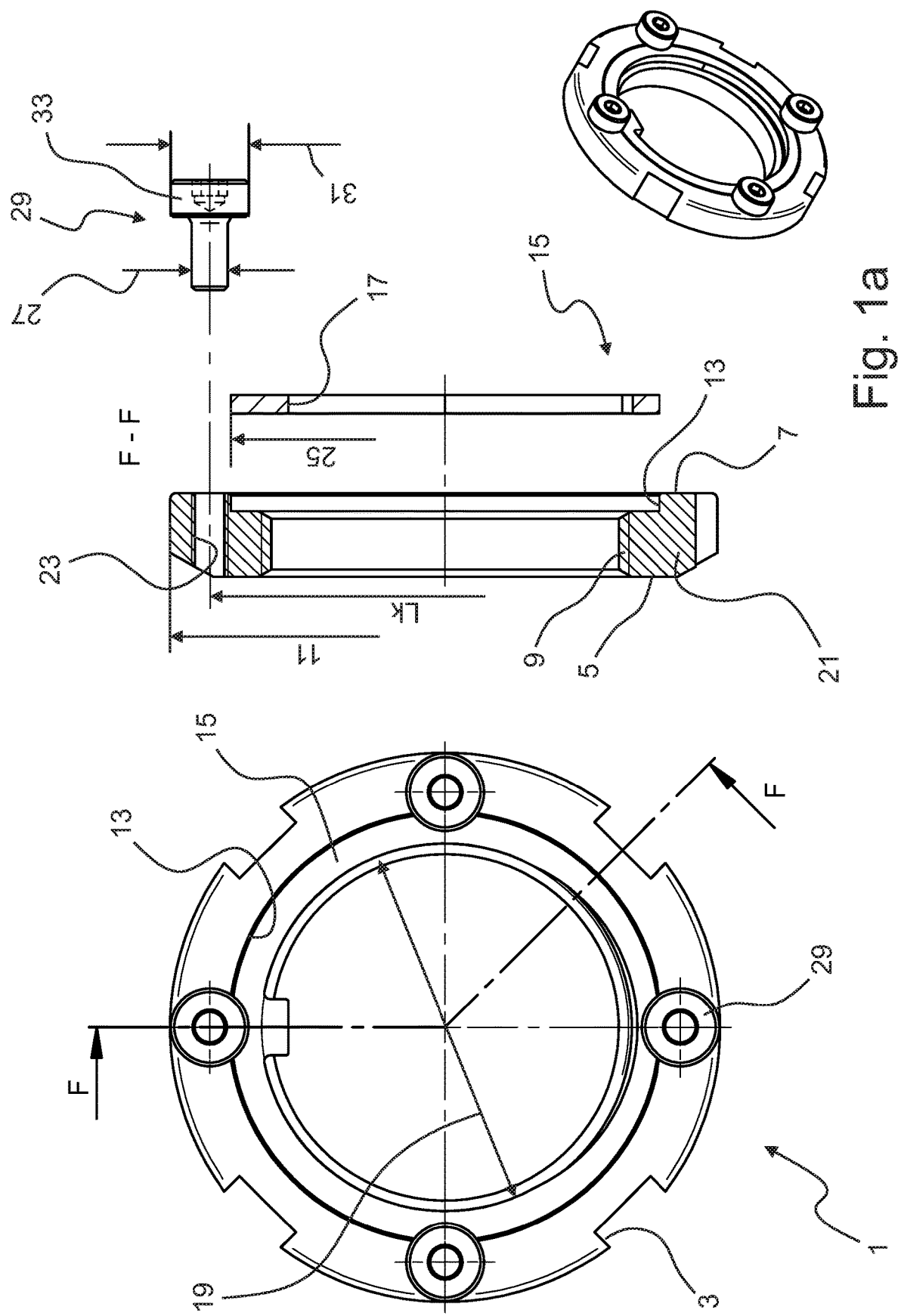

| | | | |
|---|---|---|---|
| 2010/0301665 A1* | 12/2010 | White | B23P 15/00 |
| | | | 301/105.1 |
| 2011/0299956 A1 | 12/2011 | Martensson et al. | |
| 2018/0087576 A1* | 3/2018 | Bellenger | F16C 25/083 |

FOREIGN PATENT DOCUMENTS

| | | | |
|---|---|---|---|
| DE | 36 13 415 A1 | 10/1987 | |
| DE | 694 06 652 T2 | 5/1998 | |
| DE | 199 44 131 A1 | 3/2001 | |
| DE | 19944131 A1 | 3/2001 | |
| DE | 203 02 843 U1 | 4/2003 | |
| DE | 10 2017 118 316 A1 | 2/2019 | |
| EA | 23627 B1 | 6/2016 | |
| EP | 2 927 516 B1 | 5/2017 | |
| GB | 2177178 | 1/1987 | |
| JP | 2005-145 406 A | 6/2005 | |
| RU | 2235926 C2 | 9/2004 | |
| SU | 1232862 A1 | 5/1986 | |
| WO | WO 9421930 A1 | 9/1994 | |
| WO | WO 03/036104 A1 | 5/2003 | |
| WO | WO-2009002843 A1 * | 12/2008 | F16C 25/06 |
| WO | WO 2019/030244 A2 | 2/2019 | |

* cited by examiner

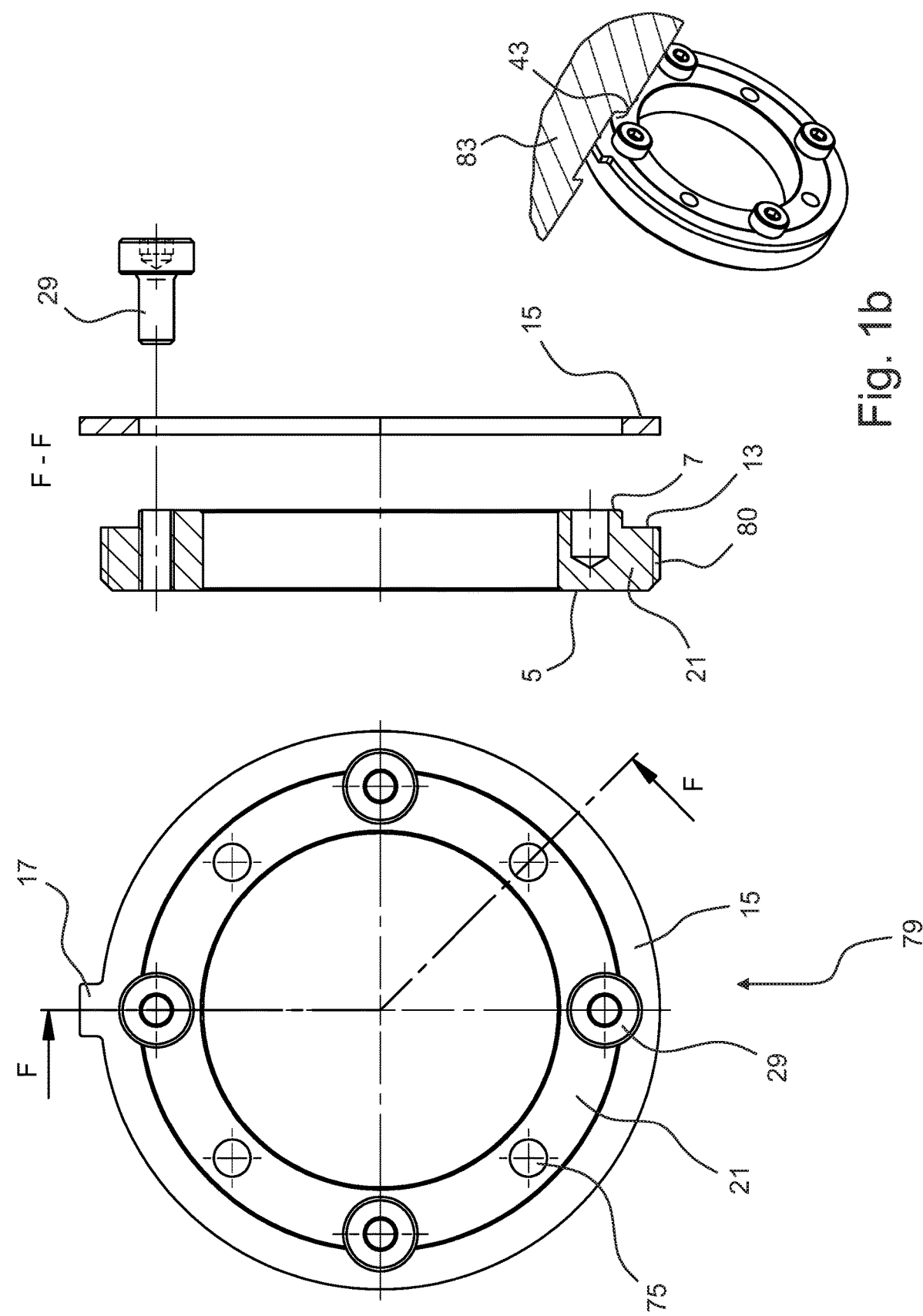

MULTI-PART ADJUSTING ELEMENT

CROSS-REFERENCE TO RELATED APPLICATIONS

This application claims priority to DE Patent Application No. 10 2019 121 755.5 filed on Aug. 13, 2019, the entire contents of which are hereby incorporated by reference.

The invention relates to a lockable precision nut and a lockable threaded ring, which are used, inter alia, in the assembly of spindles or shafts in housings. A particularly important area of application of the nuts and threaded rings according to the invention are the spindles of driven tool holders. The bearings of these spindles are subject to extremely high requirements in terms of concentricity, axial runout, preload, and rigidity. For radial and axial runout, for example, this means a periodic fluctuation of less than 4 µm.

In order to meet these requirements, it has long been known to mount the bearings (usually roller bearings and, in the case of spindles for driven tools, preferably spindle bearings or high-precision tapered roller bearings) of the shaft using a specific preload. The preload from the specifications of the bearing manufacturers should be adhered to exactly in order to achieve the necessary rigidity. In connection with bearings to be preloaded (e.g. spindle bearings) there is no clearance in the bearing and the bearing is very stiff. In connection with high-precision tapered roller bearings, it may be necessary, depending on the bearing arrangement, to set an exact basic clearance in order to achieve the desired preload in operation when the operating temperature has been reached. The adjustment of this preload or the desired basic clearance requires great care and high accuracy, because of the high stiffness of the shaft, housing, and bearings. If the preload is selected too high, the bearings will be overloaded and their service life will decrease significantly. If the preload is too low or the basic clearance is too large, the rigidity of the bearing is too low. In extreme cases, spindle bearings can even cause clearance in the bearing.

For this reason, it is customary to precisely adjust and secure the position of the bearings with the help of nuts having an internal thread, which are turned onto a counter thread of the shaft. It is important that the nut can be secured or fixed in any angular position relative to the shaft. The same applies to threaded rings having an external thread. To adjust a bearing, they are screwed into an internal thread of a housing that receives and supports the spindle bearing and, after the bearing has been correctly set, they must be secured and fixed in exactly this angular position or position.

In order to maintain the adjustment of the bearing, the adjusting element (nut or threaded ring) must be fixed relative to the shaft or to a housing without changing the adjustment of the bearing. This means that, by fixing or securing the adjusting element, there should be no displacement in the axial direction and no tilting of the same. Both have a negative impact on the bearing.

Fine threads are usually provided on the nuts and threaded rings in order to facilitate the sensitive adjustment of the bearing. For the purposes of the invention, nuts and threaded rings are summarized under the generic term "adjusting element." The invention can be used both with nuts and with threaded rings. The only difference between a nut and a threaded ring is that a nut has an internal thread, while a threaded ring has an external thread.

From DE 199 44 131 A1 a nut known as a "clamping ring" is known, in which threaded pins are screwed into corresponding threaded bores radially from the outside. So that the threaded pins do not press directly onto the external thread of a gear shaft or another component, there are resilient tongues on the inner diameter, i.e. in the region of the internal thread of the nut, onto which the end of the threaded pins presses. The resilient tongues in turn press onto the external thread of the spindle or shaft and thereby cause the nut to be clamped and secured against rotation relative to the shaft. However, tightening the threaded pins leads to an undesirable relative movement between the nut and the spindle.

Another solution is known from DE 694 06 652 T2. In this embodiment, the radially running threaded bores are designed as blind holes which are so deep that they end in the immediate vicinity of the internal thread. As a result, the internal thread becomes so soft in the radial direction that it is elastically deformed inward by tightening the threaded pins. This deformation causes the nut to jam on the external thread of the shaft. Similar solutions are known from GB 2 177 178 and WO 03/036104 A1.

These solutions known from the prior art have the disadvantage that the clamping forces of the threaded pins act between the nut and the shaft; therefore they influence the previously set position of the nut relative to the shaft and thus the bearing.

In addition, it can happen that the plane face of the nut is tilted somewhat relative to the shaft by tightening the threaded pins, so that the bearing inner ring or the bearing outer ring is loaded unevenly. This in turn leads to a selective overloading of the bearing and a reduced rigidity of the same. In addition, this error is reflected in a deterioration in the axial runout and concentricity of the entire shaft.

The person skilled in the art also knows what are known as "groove nuts" according to DIN 981 and locking plates according to DIN 5406. These locking plates have tabs on their inner diameter, which cooperate positively with a longitudinal groove of a shaft and thereby prevent the locking plate from rotating relative to the shaft. If the bearing has been adjusted by tightening the groove nut, a tab located on the outer diameter of the locking plate is bent so that it engages in one of the grooves on the outer diameter of the correspondingly positioned groove nut.

With this system, a positive locking anti-rotation lock of the groove nut is achieved in two steps or stages. Step 1: The locking plate is positively coupled to the shaft via the inner tab. Step 2: The locking plate is positively coupled to the nut via one of the outer tabs. The disadvantage of this system is that the groove nut cannot be secured in all angular positions relative to the spindle since a corresponding angular position of the tab and the groove must always be set. Therefore, the basic clearance or the preload of the bearing can only be set in relatively large discrete steps and not continuously and finely enough.

The invention has for its object to provide an adjusting element that can be secured against rotation without affecting the previously set preload of the bearing.

This object is achieved according to the invention by a multi-part adjusting element, comprising an annular base body, a locking ring and at least one clamping element (clamping screw or threaded pin), wherein the base body comprises a plane face and a thread, and wherein the anti-rotation lock between the locking ring and the shaft or housing takes place in a form-fitting manner (step 1) and the anti-rotation lock between the locking ring and nut, and/or threaded ring takes place by a releasable non-positive connection (step 2).

The principle according to the invention can also be implemented in such a way that the anti-rotation lock between the locking ring and the shaft or housing is achieved by a releasable non-positive connection (step 1) and the anti-rotation lock between the locking ring and the nut or threaded ring is achieved by a positive connection (step 2).

Due to the releasable non-positive connection according to the invention between the locking ring and the base body or the locking ring and the shaft, or the housing, a twisting of these components can be prevented after the bearings have been adjusted in any angular position by a non-positive connection; the positive connection according to the invention between the locking ring and the shaft or the locking ring and the housing results in that the flow of force during the production of the non-positive connection does not flow over the nut and the shaft, or the threaded ring and the housing, and therefore does not influence their relative position. In many cases, one or more arcuate segments are sufficient to realize the advantages according to the invention. Such a segment is therefore also a locking ring in the sense of the invention.

The non-positive connection is preferably produced by one or more clamping screws, which interact with threaded bores in the base body, by pulling the two parts against one another. The clamping force required for this can be introduced using the clamping screws without deforming the base body. The clamping screws and the associated threaded bores can be arranged parallel to a central axis of the base body or at an angle between 10°, 20°, or 30°. They can also be arranged radially.

Threaded pins can also be used to create the releasable non-positive connection between the locking ring and the shaft, or housing.

According to the invention, the force flow when the locking ring is pressed against the base body by means of clamping screws takes place exclusively within the three components of locking ring, base body, and clamping screws. The housing, a shaft or spindle, and their bearing are not influenced or impaired by the closed force flow according to the invention. The same also applies if the base body is designed as a threaded ring and has an external thread. In other words: The production of the non-positive connection according to the invention does not change the adjustment of the bearing previously made.

The type of clamping according to the invention makes it possible to connect the locking ring to the base body in a rotationally secure manner in any position without changing the position of the adjusting element on a shaft or in a housing. The orientation of the plane face of the adjusting element is also not influenced by the clamping according to the invention. As a result, a highly precise adjustment of the bearing clearance or the preload of the bearing of a shaft is possible. After the adjustment, this is no longer affected by tightening the clamping screws. Thus, by using the adjusting elements according to the invention, the adjustment of the bearing clearance or the preload of a bearing can be carried out safely, reproducibly, and reliably. Design changes to the shaft or spindle to be supported or a housing that accommodates the bearings are not necessary.

The anti-rotation lock according to the invention is also easily releasable; it can be used again, for example after replacing a bearing.

The bolt circle diameter on which the at least one threaded bore for the at least one clamping screw lies within the following limits: It is larger than the outer diameter of the locking ring plus the nominal diameter of the threaded bore. The bolt circle diameter is in turn smaller than the outer diameter of the locking ring plus the diameter of the head of the clamping screw(s) screwed into the threaded bore.

By screwing the clamping screw(s) into the threaded bores and then tightening them, the locking ring is pressed or clamped in the axial direction against the base body of the adjusting element. This creates a frictional anti-rotation lock. This clamping can take place in any (angular) position of the locking ring relative to the base body of the adjusting element.

In a corresponding manner, this is also possible with adjusting elements having an external thread (threaded rings). In this case, the thread is an external thread.

Because the clamping screws in both embodiments are aligned parallel or inclined to the longitudinal axis of the internal thread or the external thread, tightening the clamping screws and thus locking the adjusting element against rotation from the end face of a shaft or spindle is readily possible. This is an advantage that should not be underestimated when installing or adjusting spindle bearings.

Two, three or even more threaded bores and clamping screws or threaded pins are preferably provided for securing the locking ring. Then an even more reliable anti-rotation lock is achieved and the forces introduced by the clamping into the locking ring and the base body are distributed evenly over the circumference. A coordinated sequence and metering of the tightening torques of the clamping screws ensure that the locking ring can be clamped without twisting, as this means that the frictional torques under the screw heads are always significantly smaller than the frictional torques between the shaft and the base body.

A further advantageous embodiment of the invention provides that a clamping plate is arranged on each of the clamping screws. When the clamping screws are tightened, the clamping plates press the locking ring against the base body of the adjusting element and thereby cause the non-positive anti-rotation lock. In order to rule out any reaction of the tightening of the clamping screws to the previously set bearing clearance or the preload of a bearing, the clamping plates are positively secured against rotation on the base body. This positive connection can be produced, for example, by designing one or two lugs on the clamping plates, which protrude into complementary depressions in the base body of the adjusting elements. This ensures a positive locking of the clamping plates against rotation relative to the base body and thus also relative to the locking ring.

In an advantageous embodiment of the invention, the at least one clamping screw has a head having a frustoconical contact surface (countersunk screw). Then the frustoconical contact surface can cause a selective plastic deformation of the locking ring when the clamping screw is tightened, so that, in addition to the frictional clamping, there is also a positive anti-rotation lock between the base body and the locking ring. In addition, this results in securing the clamping screws against unwanted loosening. This additional security can be achieved through careful design at no additional cost.

In order to ensure the best possible centering of the locking ring relative to the base body, a recess is provided in the end face of the base body. The diameter of this recess is matched to the outer diameter of the locking ring. This recess is arranged coaxially with the internal thread of the adjusting element or the external thread of the adjusting element. It centers the locking ring over the entire circumference of the locking ring.

Alternatively, it is also possible for the centering to take place via the shafts of the clamping screws. Then the recess can be omitted. If the locking ring is sufficiently thick, centering can also be done via the external thread of a shaft or the internal thread of a housing. In this case, it has proven to be advantageous if the thickness of the locking ring is at least 1.5 times the pitch of the thread on the adjusting element or the shaft.

In a further advantageous embodiment of the invention, it is provided that at least one of the threaded bores extends radially, that the locking ring has a cylindrical portion having at least one elongated hole extending in the circumferential direction, and that the at least one clamping screw is screwed through the elongated hole into the radially extending threaded bore. In some applications, this access to the clamping screw or screws is more suitable than the access from the end face. The advantages according to the invention can also be fully realized in this exemplary embodiment.

The adjusting element can be designed as a groove nut, a cross hole nut, a face hole nut, or as a hexagon nut. All possibilities known from the prior art, a key for torque transmission from the tool to the nut or the threaded ring, can be used in the adjusting elements according to the invention.

To ensure that the adjusting element with the locking ring does not rotate relative to the shaft/to the housing, the positive-locking element of the locking ring is arranged on an inner diameter or, in the case of a threaded ring, on an outer diameter. The positive-locking element is preferably a tab which, together with a longitudinal groove in the shaft to be supported or a housing, ensures the positive locking against rotation. Because the locking ring and the base body can be non-positively secured against rotation in any angular position relative to one another, the adjusting element according to the invention can be secured against rotation relative to a shaft or to a housing in any axial position. Tightening the clamping screw(s) does not change the previously made adjustment of a bearing for the shaft in the housing.

The positive-locking element or the tab can extend radially inwards from the inner diameter or radially outwards from the outer diameter. These tabs are known per se in the case of locking plates according to DIN 5406.

The anti-rotation lock according to the invention takes place in two steps. A positive anti-rotation lock between the locking ring and the shaft is achieved by the tab and a longitudinal groove in the shaft. A non-positive anti-rotation lock between the locking ring and the base body of the adjusting element is realized by the clamping screws according to the invention.

If there is no space on the outer diameter of the shaft to introduce a longitudinal groove, it is also possible to provide one or more depressions on the end face of the shaft. The tabs of the locking ring can be inserted in a form-fitting manner into these depressions on the end face when the tab or tabs are bent over so that they extend in the axial direction.

The tabs usually have two parallel flanks that are inserted into the longitudinal groove of the shaft with little clearance. This results in a low torsional backlash and, due to the fine thread usually used, a very low axial impact. This backlash and thus the axial effect can be eliminated if the tab or tabs have two wedge-shaped flanks and these wedge-shaped flanks are dimensioned such that they lead to a slight spring-back of the locking ring when the tabs are inserted into the longitudinal grooves of the shaft. As a result, this positive anti-rotation lock is absolutely free of clearance. The spring forces acting between the shaft and the locking ring have only a very slight influence on the position of the base body.

It is also possible for the tab or tabs to have an opening which, together with a pin or a projection on the shaft (for example end face), provide a form-fitting anti-rotation lock between the shaft and the locking ring. This also allows a very low-clearance anti-rotation lock between the adjusting element and the shaft to be realized.

The locking ring can also be designed as a circular segment.

Further advantages and advantageous configurations can be found in the following drawings, the description thereof, and the claims. All of the features disclosed in the drawings, the description thereof, and the claims can be substantial to the invention both individually and in any combination.

DRAWINGS

In the drawings:
FIGS. 1 to 22: Exemplary embodiments of adjusting elements according to the invention, and
FIG. 23: a driven tool holder having an adjusting element according to the invention.

DESCRIPTION OF THE EXEMPLARY EMBODIMENTS

In all figures, the same reference numerals have been assigned to the same components. For reasons of clarity, not all reference numerals have been entered into all figures and views.

FIG. 1*a* shows an exemplary embodiment of an adjusting element according to the invention in a view from the front and in a side view as an exploded view. The most important components and functional surfaces of the multi-part adjusting element according to the invention are explained with reference to this FIG. 1*a*.

The adjusting element shown in FIG. 1*a* is designed as a nut 1. More specifically, it is a groove nut having four grooves 3 arranged on the circumference. Using a hook wrench (not shown), which is inserted into one of the grooves 3, the nut 1 can be rotated.

The nut 1 or the adjusting element comprises a base body 21 on which a plane face 5, an oppositely arranged end surface 7, an internal thread 9, an outer diameter 11, a recess 13, and a plurality of threaded bores 23. If the adjusting element is a threaded ring, then it has an external thread 80 (see FIG. 1*b*).

In the region of the end face 7, a recess 13 is recessed. The recess 13 is arranged concentrically with the internal thread 9 and receives a locking ring 15 according to the invention.

A locking ring 15 interacts with the base body 21 and has a tab 17, an inner diameter 19, and an outer diameter 25. In this exemplary embodiment, the locking ring 15 is circular on the outer diameter 25 thereof, i.e. it has no projections or depressions. A tab 17 is formed on the inner diameter 19 of the locking ring 15. This tab 17 is immersed into a longitudinal groove of a shaft in the assembled state. This creates a non-rotatable positive connection between the locking ring 15 and the above-mentioned shaft. The nut 1, i.e. the adjusting element, is in turn screwed onto the shaft.

A diameter of the optional recess 13 is dimensioned such that the locking ring 15 with its outer diameter 25 can be inserted into the recess 13.

An inner diameter 19 of the locking ring 15 is slightly larger than the nominal diameter of the external thread of the shaft, not shown. The locking ring 15 is not centered on the thread of the shaft in this exemplary embodiment; the locking ring 15 is centered via the recess 13 in the base body 21 of the nut 1 or the adjusting element. In this exemplary embodiment, the depth of the recess 13 is less than or equal to the thickness of the locking ring 15.

In this exemplary embodiment, four threaded bores 23 are provided in the base body 21 distributed over the end face, the longitudinal axes of which run parallel to the longitudinal axis of the internal thread 9.

The diameter $D_{LK}$ of the bolt circle LK lies preferably within the following limits:

The center lines of the threaded bores 23 lie on a bolt circle LK whose diameter $D_{LK}$ is larger than the outer diameter 25 of the locking ring 15 plus the nominal diameter 27 of a clamping screw 29.

The diameter $D_{LK}$ of the bolt circle LK of the threaded bores 23 is smaller than the outer diameter 25 of the locking ring 15 plus a diameter 31 of the head 33 of the clamping screws 29. As a result, the locking ring 15 is held axially by the clamping screws 29 when they are not tightened and allow the locking ring 15 to rotate freely.

It is also ensured that the locking ring 15 is pressed against the base body 21 by tightening the clamping screws 29, because the inner regions of the heads 33 of the clamping screws 29 press onto the locking ring 15 when the clamping screws 29 are tightened. This can be seen in the view from the front of the nut 1 with the locking ring 15 installed.

In this exemplary embodiment, the recess 13 has the task of concentrically aligning the locking ring 15 with the internal thread 9 of the base body 21. It is also possible to omit the recess 13. The shafts of the clamping screws 29 can then center the locking ring 15 (see also FIGS. 7 and 8). Then the diameter $D_{LK}$ of the bolt circle LK is only slightly larger than the outer diameter 25 of the locking ring 15 plus the nominal diameter 27 of the clamping screws 29. In this case, the shafts of the clamping screws 29 center the locking ring 15 relatively to the thread 9 of the base body 21.

In FIG. 1a, a nut 1 having an internal thread 9 was described as an adjusting element. However, it is also possible to implement the anti-rotation lock according to the invention in a threaded ring 79 which has an external thread 80 on the outer diameter 11 of the base body 21. A threaded ring 79 having an external thread 80 is shown in FIG. 1b. The comparisons of FIGS. 1a and 1b show the similarities of the two adjusting elements according to the invention.

In this configuration, the tab 17 is arranged on the outer diameter. At the transition between the end face 7 and the outer diameter there is an optional recess 13 which centers the locking ring 15 on its inner diameter.

The threaded ring 79 has entrainment elements on its end face 7, which are designed here as bores 75. A corresponding tool can be attached to these entrainment elements in order to be able to turn the threaded ring 79 and in this way to be able to adjust the bearing.

Constructive details and advantages of the invention are explained below predominantly in connection with various exemplary embodiments relating to nuts 1 having an internal thread 9. However, it is readily possible for the person skilled in the art to transfer these to a threaded ring 79 having an external thread 80 analogous to FIG. 1b.

Figure 2:
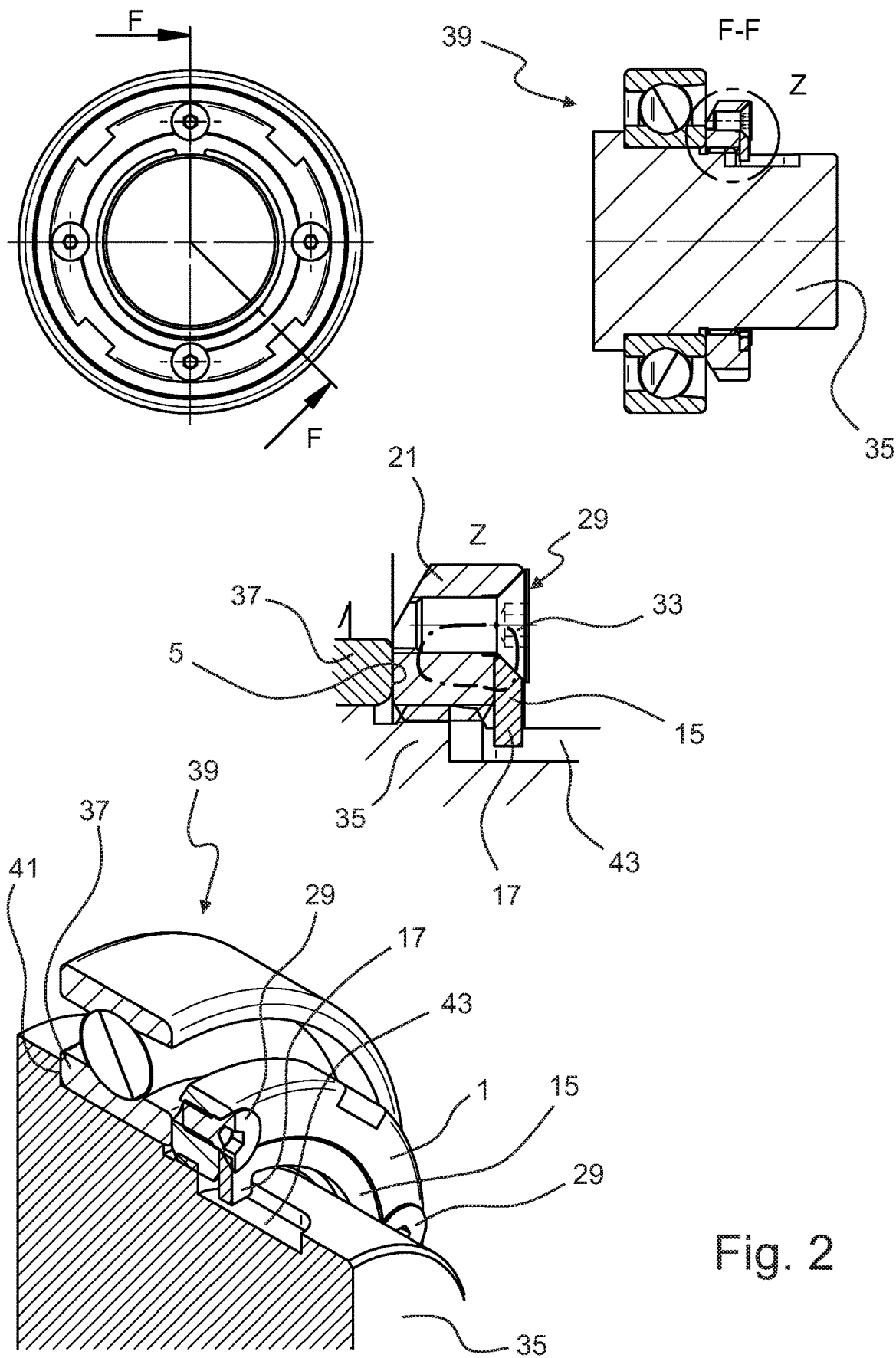

FIG. 2 shows an installation situation of a nut 1 according to the invention having a locking ring 15 as an example in different views. As can be seen particularly clearly from the enlarged detail Z, the base body 21 of the nut 1 is screwed with its internal thread 9 onto an external thread of a spindle or shaft 35. For reasons of clarity, no reference numerals have been entered for the external thread of the shaft 35 and the internal thread 9 of the base body 21.

As can further be seen from the detail Z, the plane face 5 of the nut 1 bears against an inner ring 37 of a roller bearing 39. The nut 1 presses the inner ring 37 against a collar or shoulder 41 of the shaft 35. In other words, the roller bearing 39 is clamped as a fixed bearing on the shaft 35 in this exemplary embodiment.

In this exemplary embodiment, the clamping screw 29 is designed as a countersunk head screw. Therefore, the threaded bores 23 are provided in the base body 21 with a corresponding countersunk point. The locking ring 15 has no such countersinks. Rather, the countersunk heads of the clamping screws 29 deform the locking ring 15 locally and plastically when tightened. This deformation is shown in detail Z. It forms an additional positive connection and anti-rotation lock between the locking ring 15 and the clamping screw 29. It also prevents unintentional loosening of the clamping screws 29; it also acts as a screw lock.

Because, as can be seen from the isometric drawing and the section in FIG. 2, the tab 17 of the locking ring 15 is received in a longitudinal groove 43 of the shaft 35 in a rotationally fixed but axially displaceable manner, the tightening of the clamping screws 29 results in a positive and frictionally locking anti-rotation lock of the nut 1 relative to the shaft 35.

The clamping of the locking ring 15 against the base body 21 with the aid of the clamping screws 29 leads to a closed flow of force between the base body 21, the locking ring 15, and the clamping screws 29. This flow of force is symbolically represented by the dashed line in detail Z.

The internal thread 9 of the nut 1 and the external thread of the shaft 35 are not influenced by this clamping process. Therefore, the axial force applied by the nut 1 on the plane face 5 on the inner ring 37 of the roller bearing 39 is not changed by the clamping process. In other words: Tightening the clamping screws 29 has no influence on the position of the nut 1 relative to the shaft 35 or the inner ring 37 of the roller bearing 39. This is an advantage of the adjusting element according to the invention.

Another advantage is that the clamping between the inner ring 15 and the base body 21 can be released at any time by loosening the clamping screws 29. Then the frictional engagement between the locking ring 15 and the base body 21 of the nut 1 is released, as is the optional positive connection between the countersunk heads of the clamping screw 29 and the locking ring 15.

As a rule, the locking ring 15 will be replaced with the plastic deformations caused by the clamping screws 29 after use.

In the exemplary embodiment shown in FIG. 2, a longitudinal groove 43 is machined into the shaft 35, which brings about a positive connection with the tab 17 of the locking ring 15. The locking ring 15 remains axially displaceable, but the locking ring 15 is prevented from rotating relative to the shaft 35 in a form-fitting manner.

FIG. 2 shows that the longitudinal groove 43 is closed towards the end of the shaft 35. In order to be able to slide the locking ring onto the shaft, it has to be mounted coaxially offset. This means that the inner circle between the tab 17 and the inner diameter 19 of the locking ring is larger or at least as large as the shaft diameter. This allows the locking ring to be pushed coaxially offset onto the shaft until the tab 17 can engage into the longitudinal groove 43. Then, it is possible to push the locking ring coaxially into the recess 13 of the base body 21. The clamping screws are usually to be installed afterwards. Depending on the geometric design of the components, however, a radial installation clearance can be integrated partially or even over the entire circumference with slightly loosened clamping screws 29.

Figure 3:
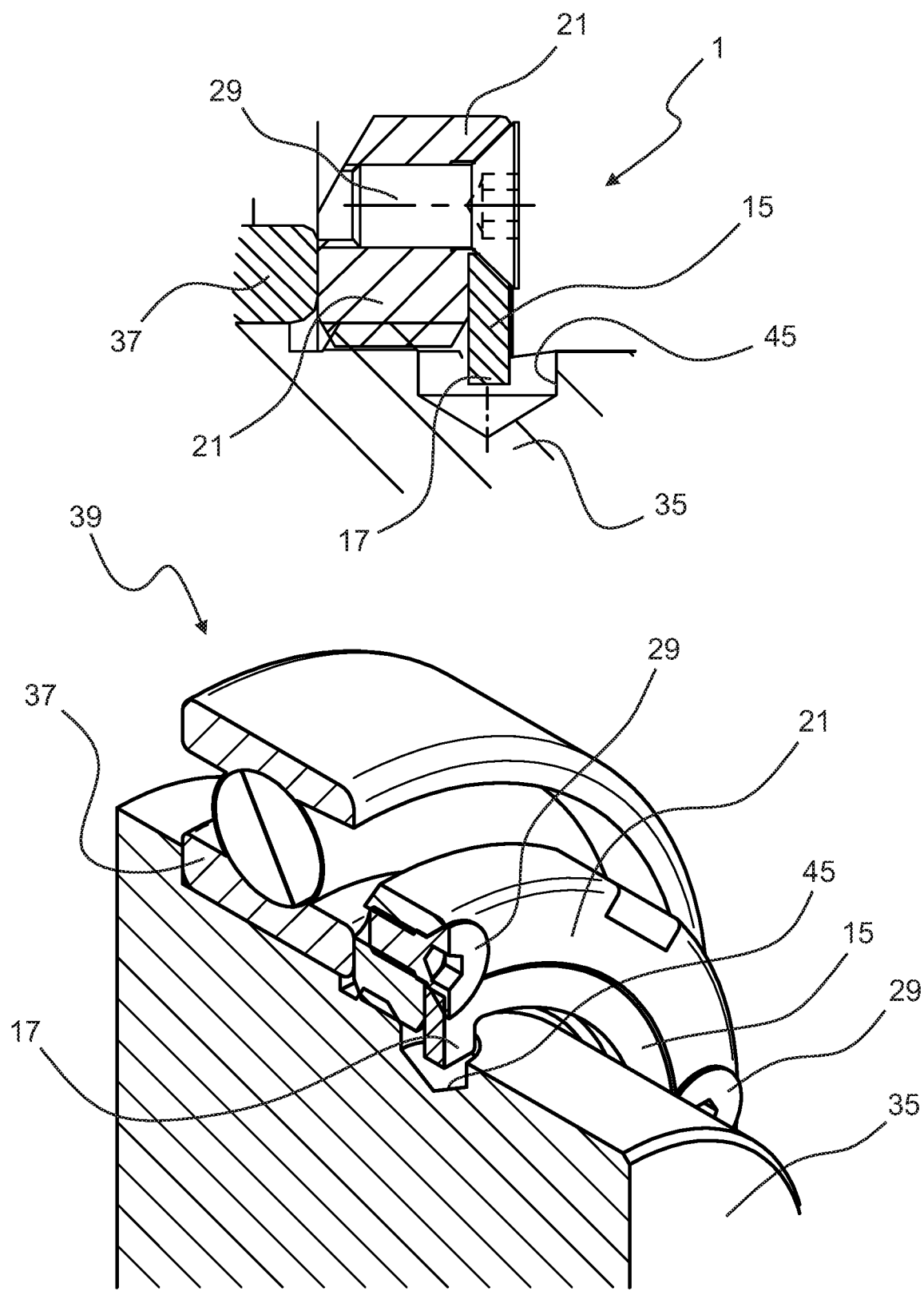

A somewhat simplified exemplary embodiment is shown in FIG. 3, in which a radial depression 45 or countersink is provided in the shaft 35 instead of the longitudinal groove 43. This depression 45 can be produced, for example, with the aid of a twist drill.

Figure 4:
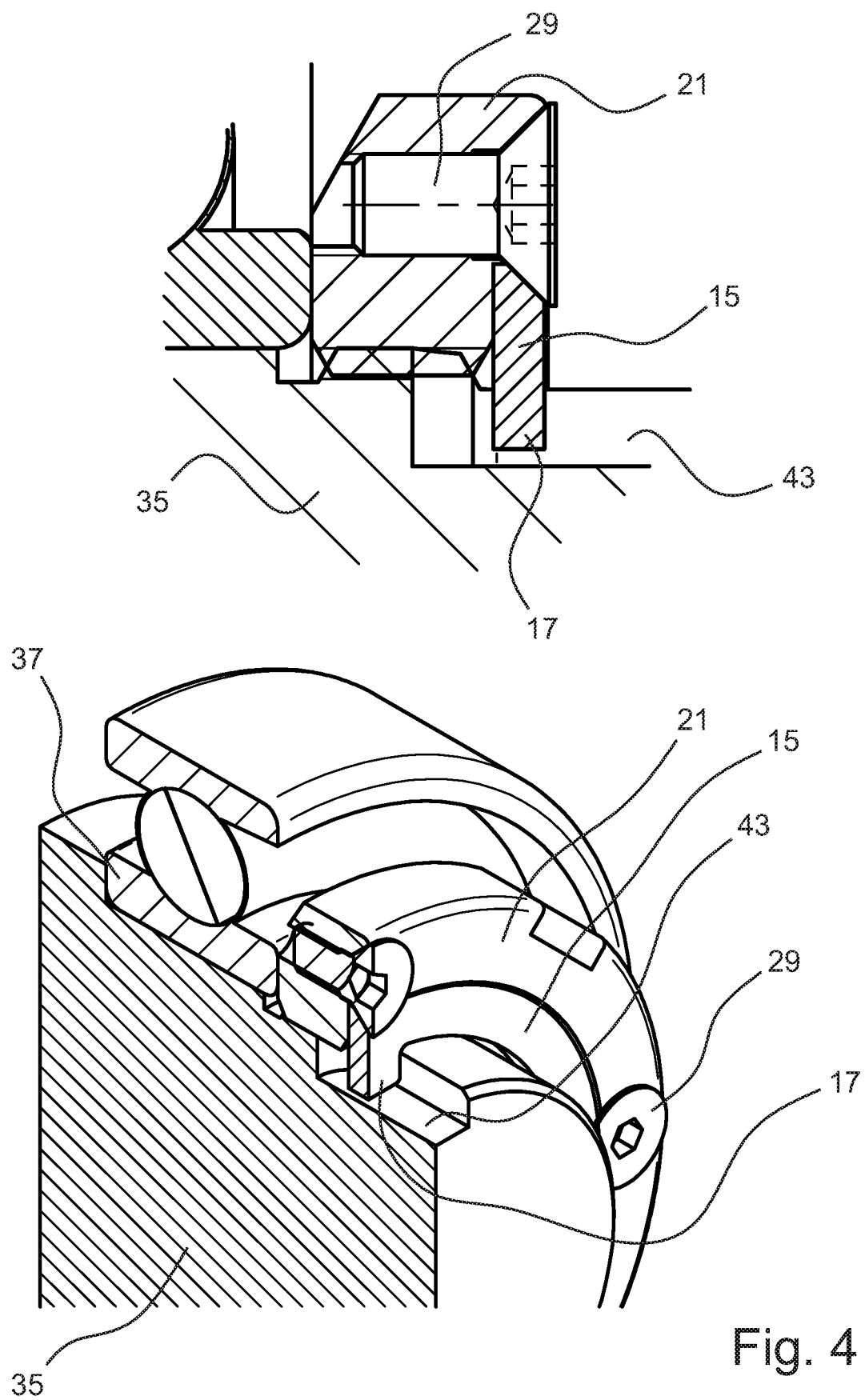

In FIG. 4, the longitudinal groove 43 is open towards the end face of the shaft 35. This variant is particularly simple in terms of production technology. In the exemplary embodiments according to FIGS. 2, 3 and 4, no changes to the adjusting element according to the invention are necessary. The differences concern the shaft 35.

Figure 5:
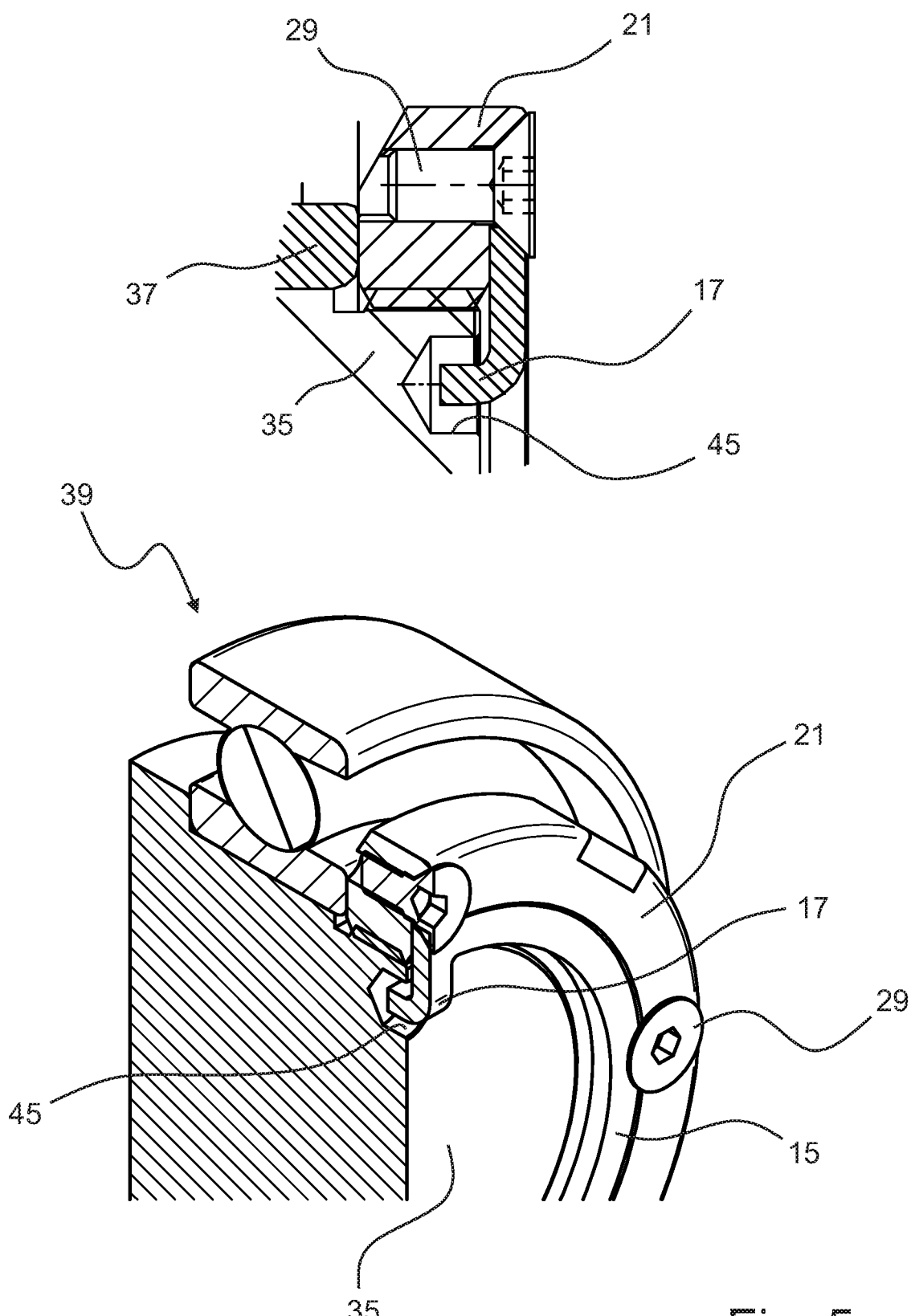

A further exemplary embodiment is shown in FIG. 5, in which the tab 17 initially extends radially inwards and is then angled in the axial direction, i.e. by approximately 90°. The end of the tab 17, which extends in the axial direction, engages in a depression 45 on the end face of the shaft 45 and thereby produces the desired positive connection, so that the locking ring 15 is secured against rotation relative to the shaft 35. This embodiment is particularly advantageous if no grooves or bores are desired or should be possible on the circumference of the shaft.

The tab 17 is preferably resilient, so that only negligibly small forces are transmitted in the radial direction from the shaft to the locking ring. Therefore, all the advantages according to the invention are also fully realized in this embodiment.

Figure 6:
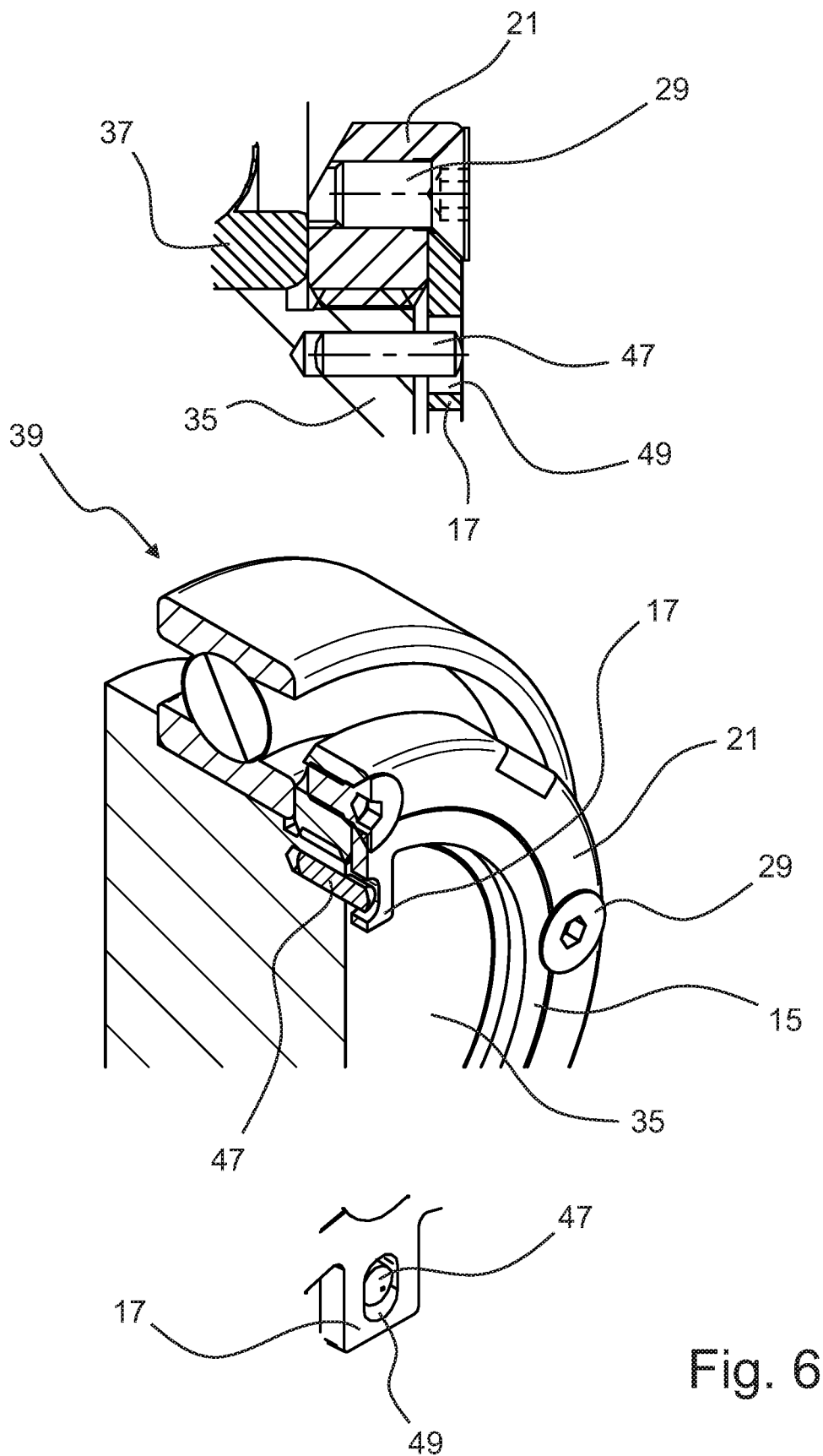

A further exemplary embodiment is shown in FIG. 6, in which the positive connection between shaft 35 and locking ring 15 likewise takes place via the end face of the shaft 35. In this exemplary embodiment, a pin 47 is pressed in on the end face of the shaft 35 and protrudes beyond the end face of the shaft 35 in the axial direction. Together with an opening 49 in the tab 17, this pin 47 forms a positive connection which prevents the locking ring 15 from rotating relative to the shaft 35.

The width of the opening 49 is matched to the diameter of the pin 47 in such a way that a positive connection which is as clearance-free as possible is created in the tangential direction of the locking ring 15. The opening 49 is preferably designed such that it is longer in the radial direction than the diameter of the pin 47. As a result, there is clearance in the radial direction between the pin 47 and the opening 49, so that there is no tension and no transmission of forces in the radial direction between the locking ring 15 and the shaft 35.

Figure 7:
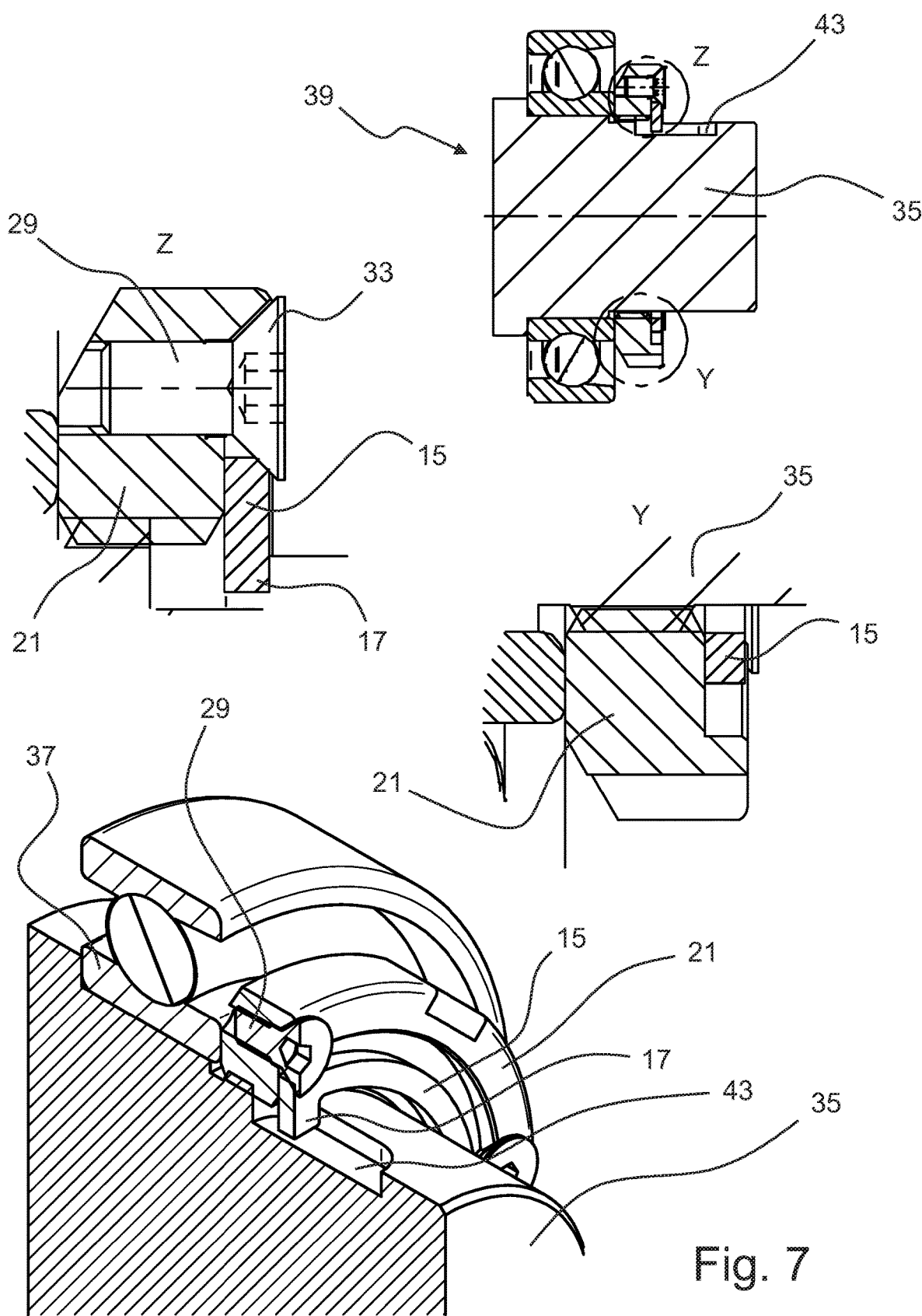

FIG. 7 shows an exemplary embodiment in which the locking ring 15 is centered on the shafts of the clamping screws 29. The guiding or centering can also take place via the countersunk head 33 of the clamping screws 29. In this exemplary embodiment, three or more clamping screws 29 should be arranged distributed over the circumference in order to ensure a sufficiently precise centering of the locking ring 15 relative to the base body 21 of the nut 1.

Figure 8:
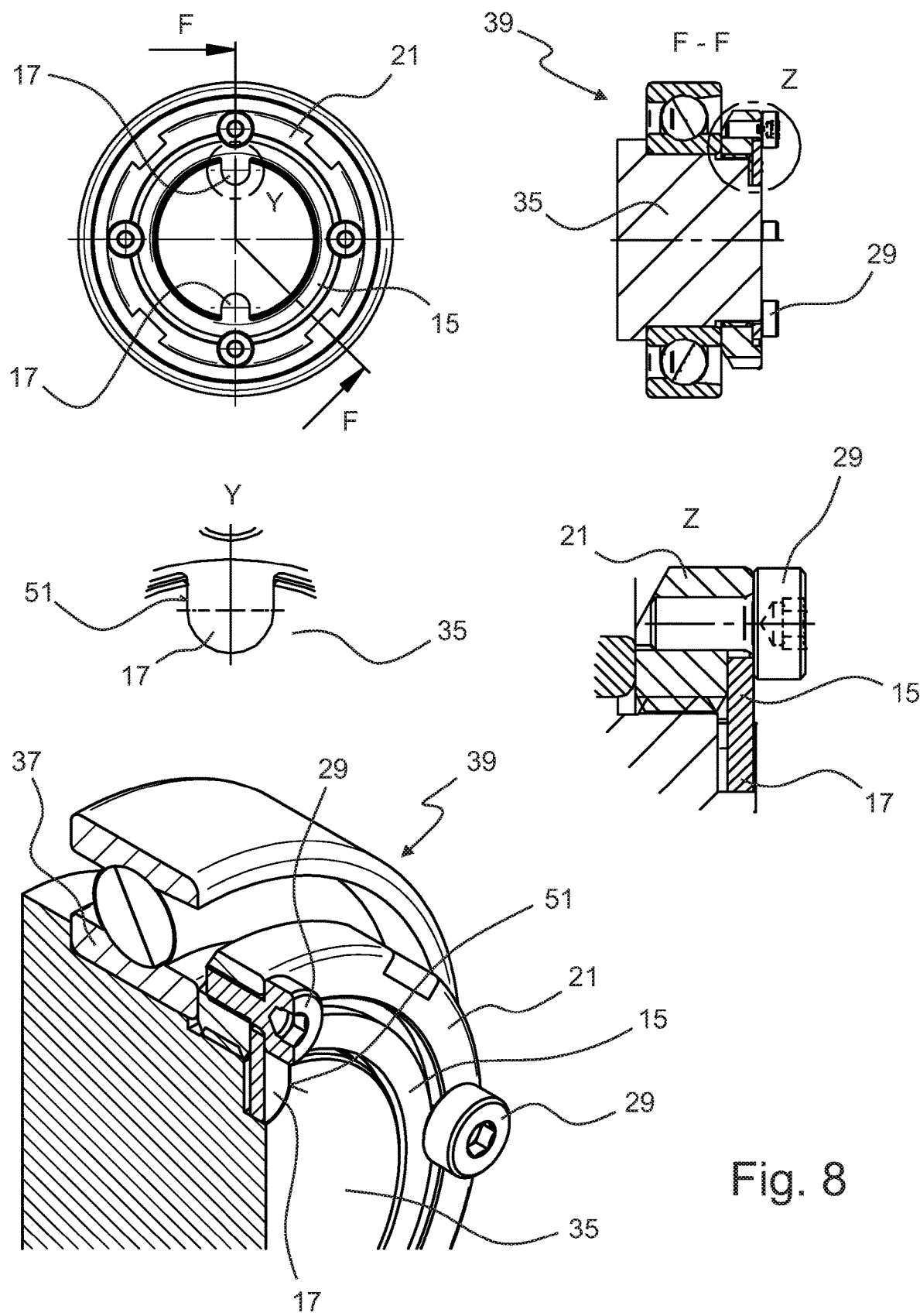

FIG. 8 shows an exemplary embodiment in which the locking ring 15 is centered via the tab 17. The tabs 17 are inserted into complementarily shaped recesses 51 on the end face of the shaft 35. As a result, the locking ring 15 is centered. In this exemplary embodiment, it is sufficient if at least two tabs 17 arranged offset by 180° engage into two cutouts 51. Versions with more than two tabs 17 and more than two recesses 51, which center the locking ring 15, are of course also possible.

This ensures the positioning/centering of the locking ring 15 relative to the shaft 35 and there is no direct contact via the outer diameter of the shaft 35 and the inner diameter of the locking ring 35. In addition, no radial force can be transmitted from the locking ring to the base body 21, which leads to a displacement of the base body 21 on the shaft 35.

In this exemplary embodiment, the clamping screws 29 are designed as "normal" screws, i.e. without a countersunk head. When the clamping screws 29 are tightened, there is a frictional, axial clamping between the locking ring 15 and the base body 21 of the nut 1.

Figure 9A:
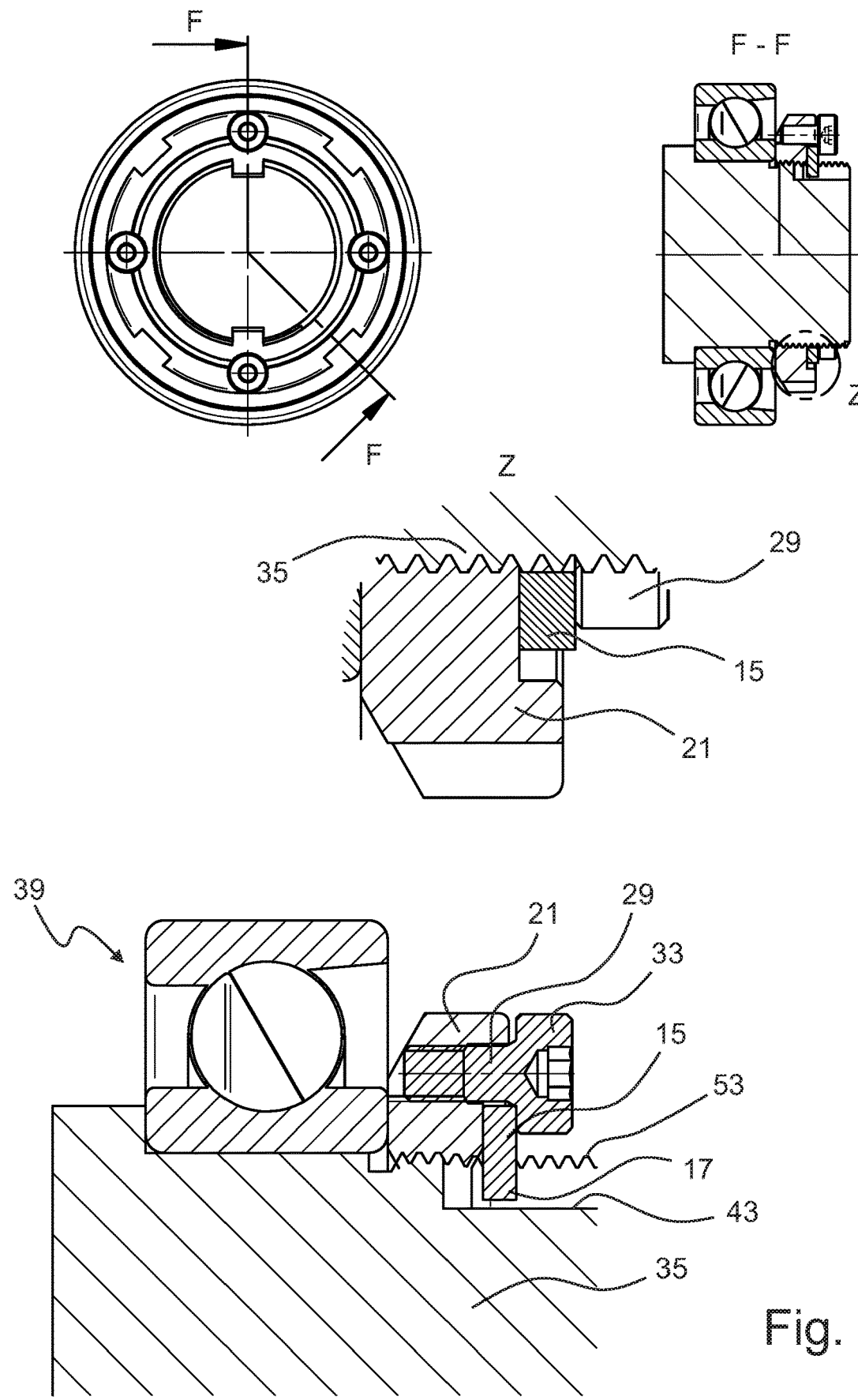

FIG. 9a shows an exemplary embodiment in which the locking ring 15 is centered on the external thread 53 of the shaft 35 via its inner diameter. In this variant, it makes sense if the thickness of the locking ring 15, i.e. its extension in the axial direction of the shaft 35, is greater than the pitch of the external thread of the shaft 35. Then it is ensured that the locking ring 15 does not get caught in the external thread 53. The external thread of the shaft 35 has the reference symbol 53 in detail Z.

Figure 9B:
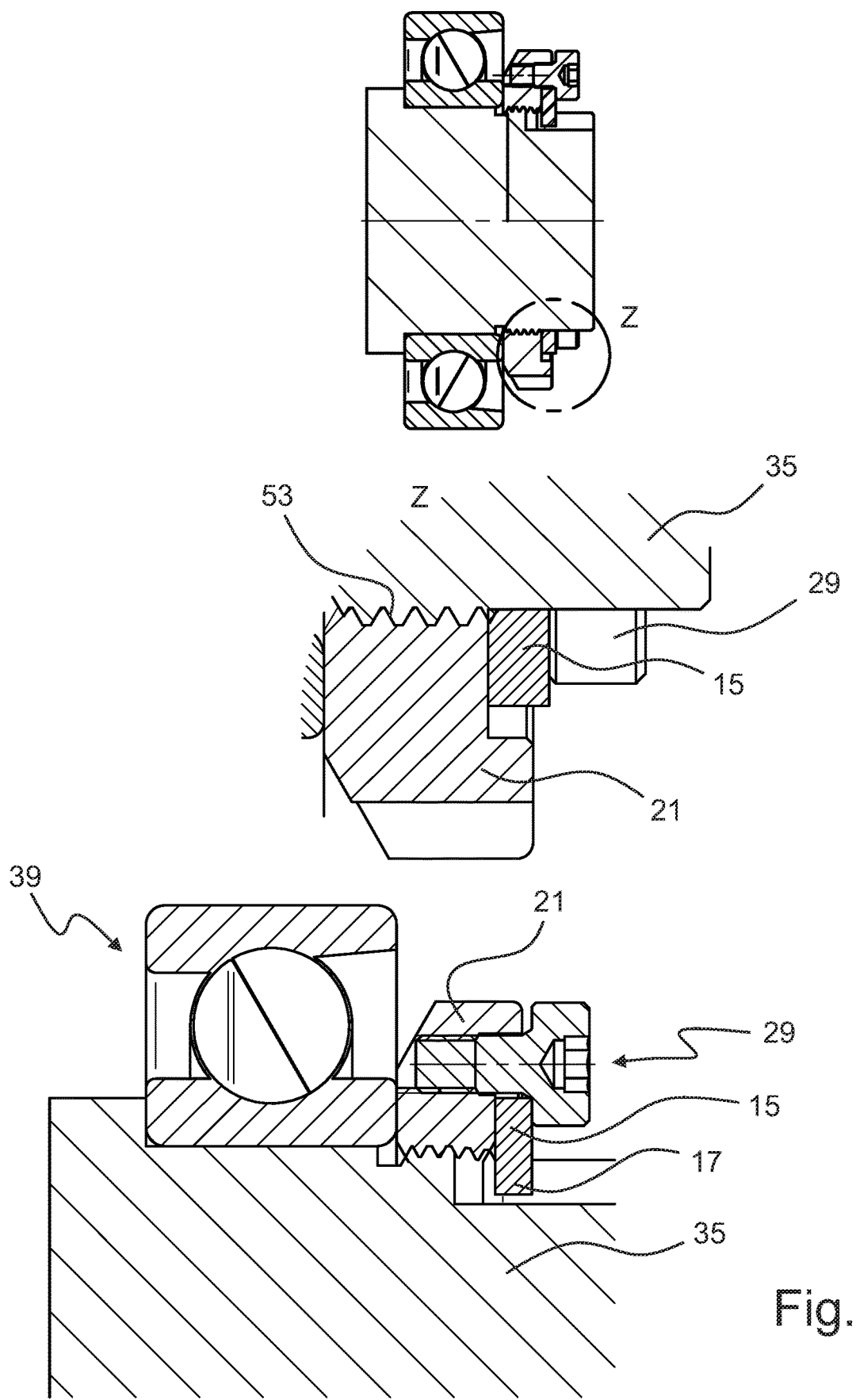

FIG. 9b shows the situation that the shaft 35 where the locking ring 15 is located does not have an external thread 53, but is somewhat reduced in diameter, and in this way a cylindrical contact surface for centering the locking ring 15 is present.

Figure 10:
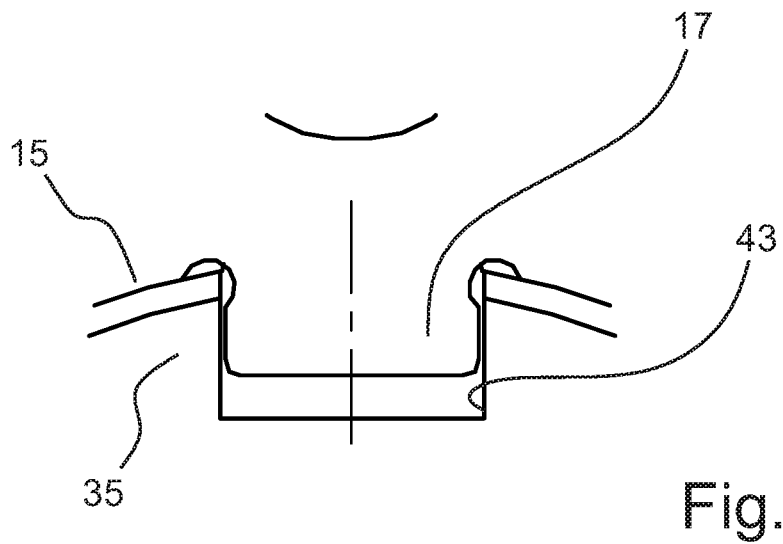
Figure 11:
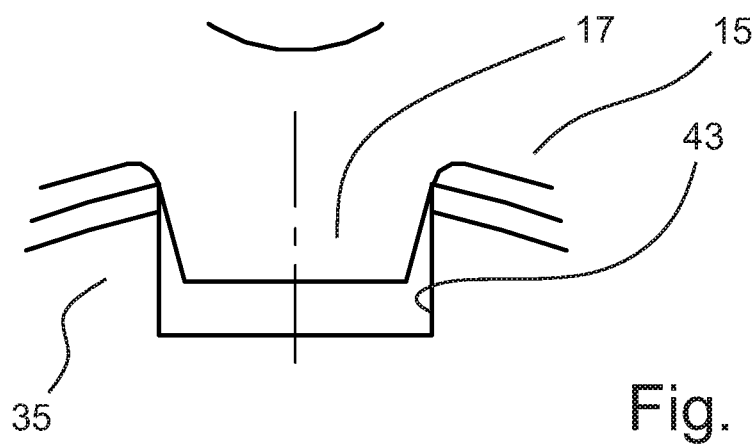
Figure 12:
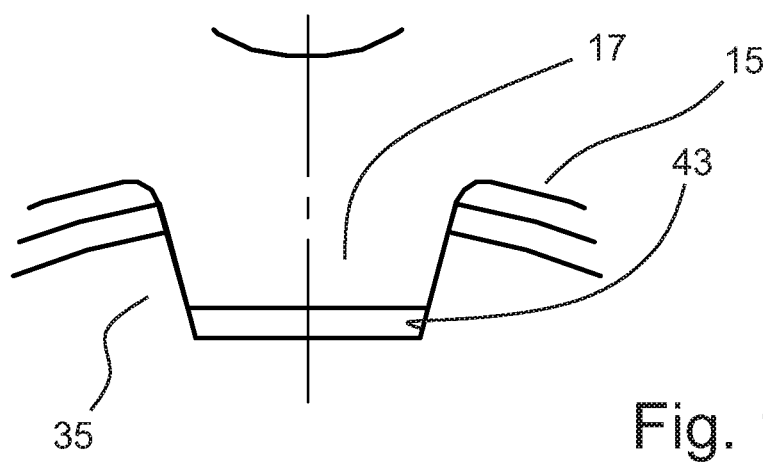

Different designs of the tabs 17 are shown in FIGS. 10, 11, and 12. In FIG. 10, there is a slight clearance in the circumferential direction between the flanks of the longitudinal groove 43 and the flanks of the tabs 17. This small circumferential clearance is tolerable in many applications.

FIG. 11 shows an exemplary embodiment in which the flanks of the tab 17 are wedge-shaped. The dimensions of the wedge-shaped flanks are selected so that the flanks are resilient from above at the corners of the longitudinal groove 43 to the diameter of the shaft. This ensures a clearance-free positive connection between the tab 17 and the longitudinal groove 43 of the shaft in the tangential direction.

The same effect, but with an increased contact surface between tab 17 and the longitudinal groove 43, results if the flanks of the longitudinal groove 43 are also arranged in a wedge shape and run parallel to the wedge-shaped flanks of the tab 17. This embodiment is shown in FIG. 12.

Figure 13:
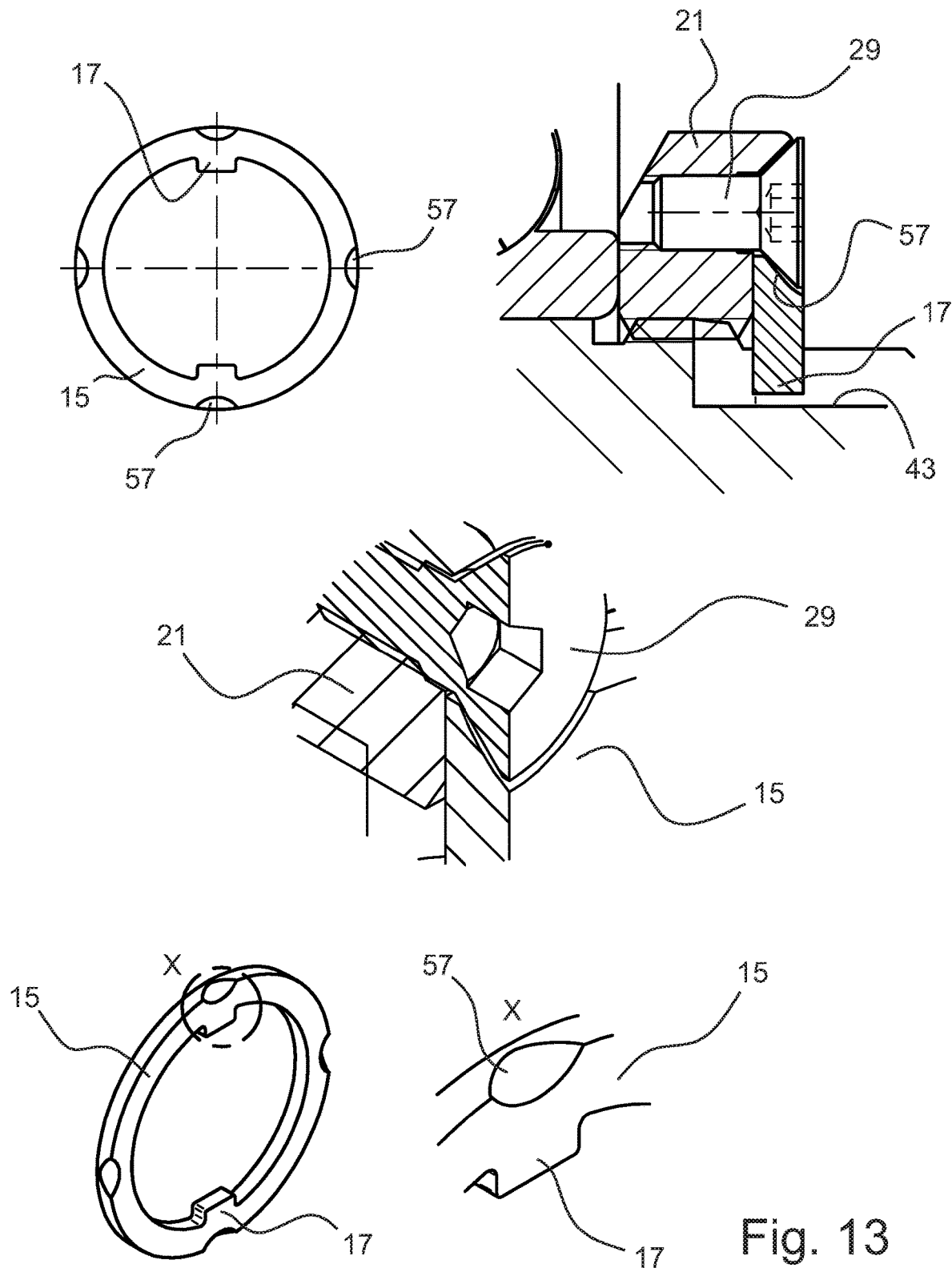

FIG. 13 shows in detail X the plastic deformation 57 on the outer edge of the locking ring 15, which has already been described multiple times, by tightening the clamping screws 29 with a countersunk head. This results in an additional positive connection between the clamping screws 29 and the locking ring 15.

Figure 14:
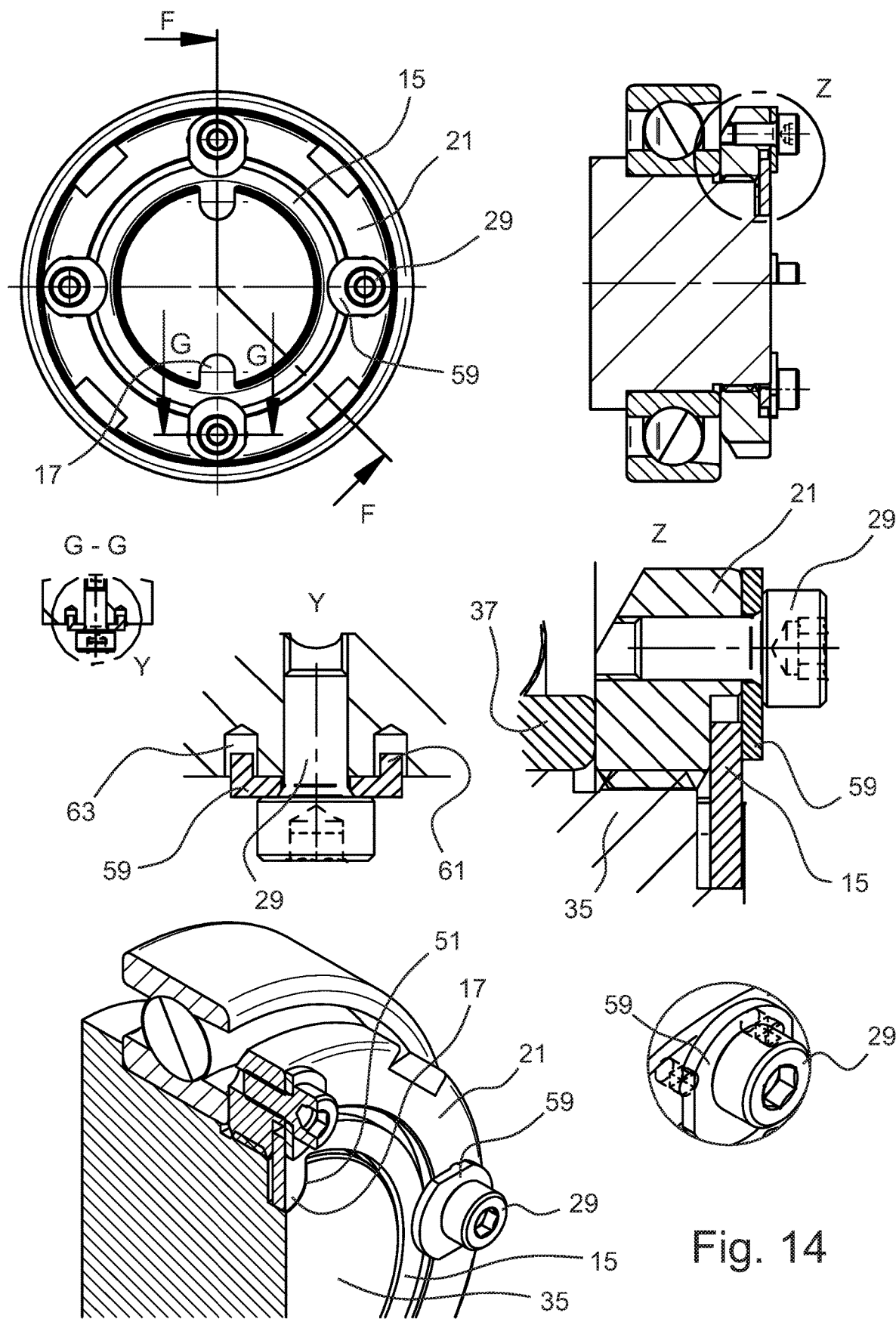

FIG. 14 shows an exemplary embodiment in which a clamping plate 59 is provided under the head 33 of the clamping screws 29. The clamping plate 59 functions similarly to a clamping claw and presses the locking ring 15 in the axial direction against the complementary contact surface in the base body 21 of the nut 1.

In a particularly preferred embodiment of the invention, the clamping plates 59 have one or two projections 61 on their side facing the base body 21. These projections 6 dip into complementary recesses 63 on the end face of the base body 21. This ensures that the clamping plates 59 are locked against rotation and the clamping plates 59 do not rotate when the clamping screws 29 are tightened.

Figure 15:
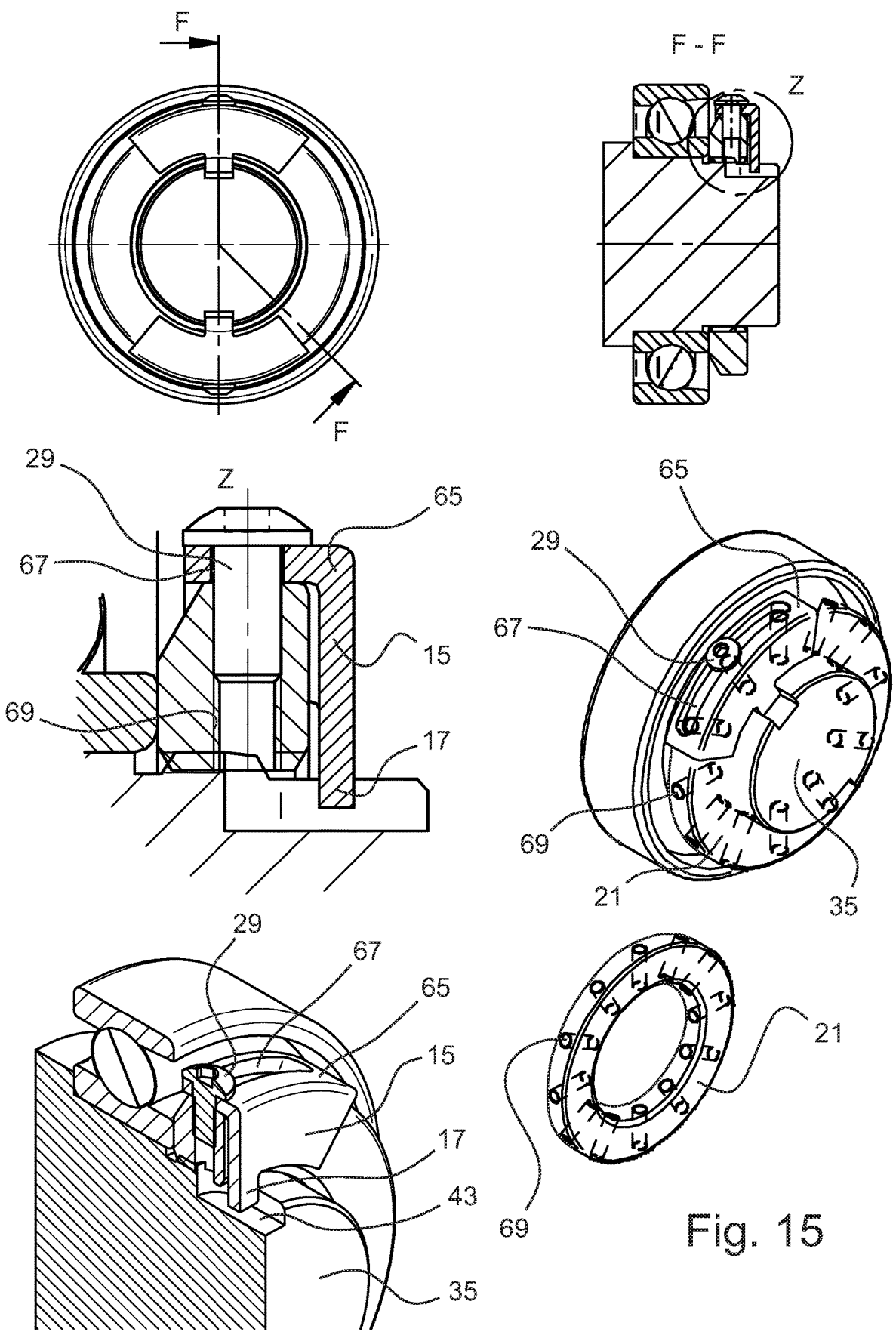

FIG. 15 shows a further exemplary embodiment in which the locking ring 15 has an axial extent. The locking ring 15 consists of an annular surface with an adjoining cylindrical portion 65. The cylindrical portion 65 encloses the base body 21 of the nut 1.

A circumferential groove 67 is present in the cylindrical portion 65. A clamping screw 29 is inserted through this circumferential groove 67 and screwed into a radially extending threaded bore in the base body 21 of the nut 1. In FIG. 15, only a segment of approximately 45° section of the locking ring 15 and the cylindrical portion 65 is shown.

In many exemplary embodiments, it is sufficient to use such a segment as a locking ring. However, it is also possible, as in the other embodiments, to form the locking ring as a closed ring as shown in FIG. 16.

If a plurality of radially extending threaded bores 69 are present over the circumference of the base body 21 and the distance between these threaded bores 69 is smaller than the tangential extension of the circumferential groove 67, the locking ring 15 can also be clamped to the base body 21 in any angular position in this exemplary embodiment with the aid of the clamping screws 29.

Figure 16:
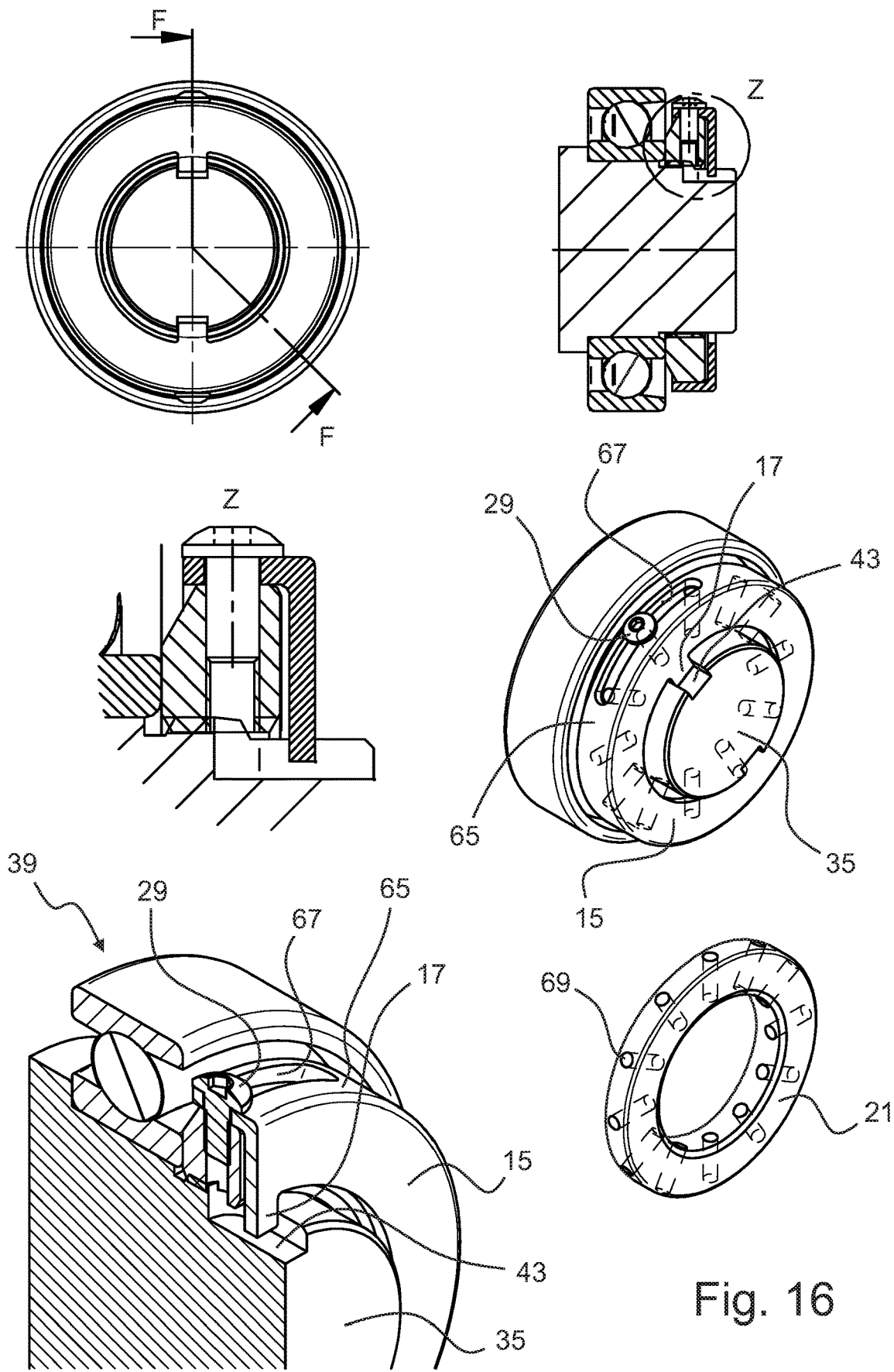

In the exemplary embodiment according to FIG. 16, the locking ring 15 with the cylindrical portion 65 is shown as a closed body.

Figure 17:
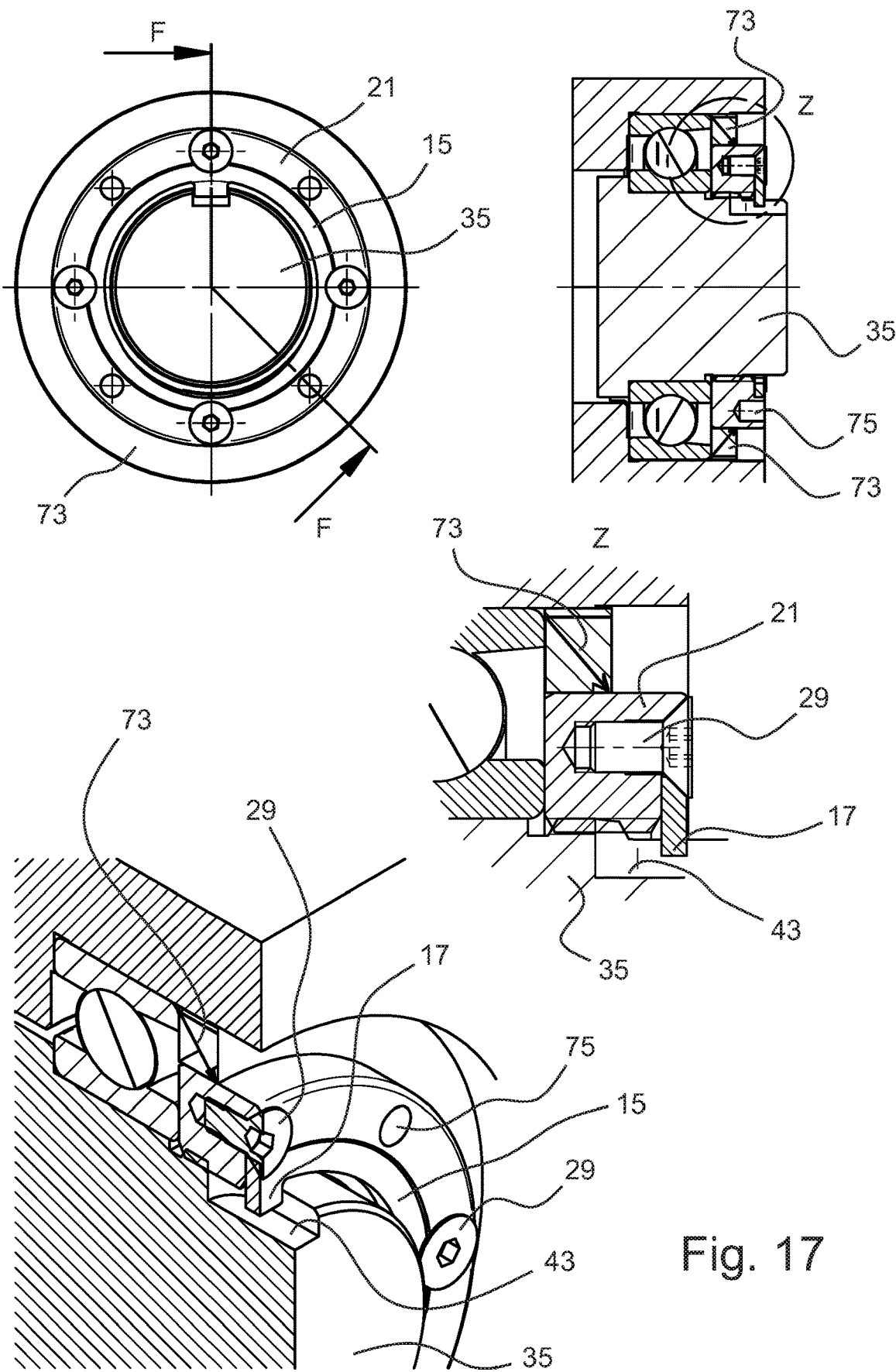

In the exemplary embodiment according to FIG. 17, the cylindrical base body 21 of the nut has no grooves or bores on the outer diameter, so that the outer diameter of the base body 21 can be used as a sealing surface, which interacts, for example, with a radial shaft sealing ring or any gap seal (not shown).

In order to be able to introduce the torque required for adjusting the nut 1 into the base body 21, entrainment elements, shown here as bores 75, can be mounted onto the end faces of the base body for this purpose. A corresponding tool can be attached to these entrainment elements and in this way the nut 1 can be rotated relative to the shaft 35.

Due to the design of the lock of the adjusting element and the shaft/housing which is free from lateral force according to the invention, there is no radial displacement of the two components relative to one another even when securing. This is of particular advantage for the seal, since this means that the sealing elements are optimally aligned coaxially with one another. Problems caused by leaks resulting from a specific disaxial orientation of the seal and the running surface are largely reduced.

Figure 18:
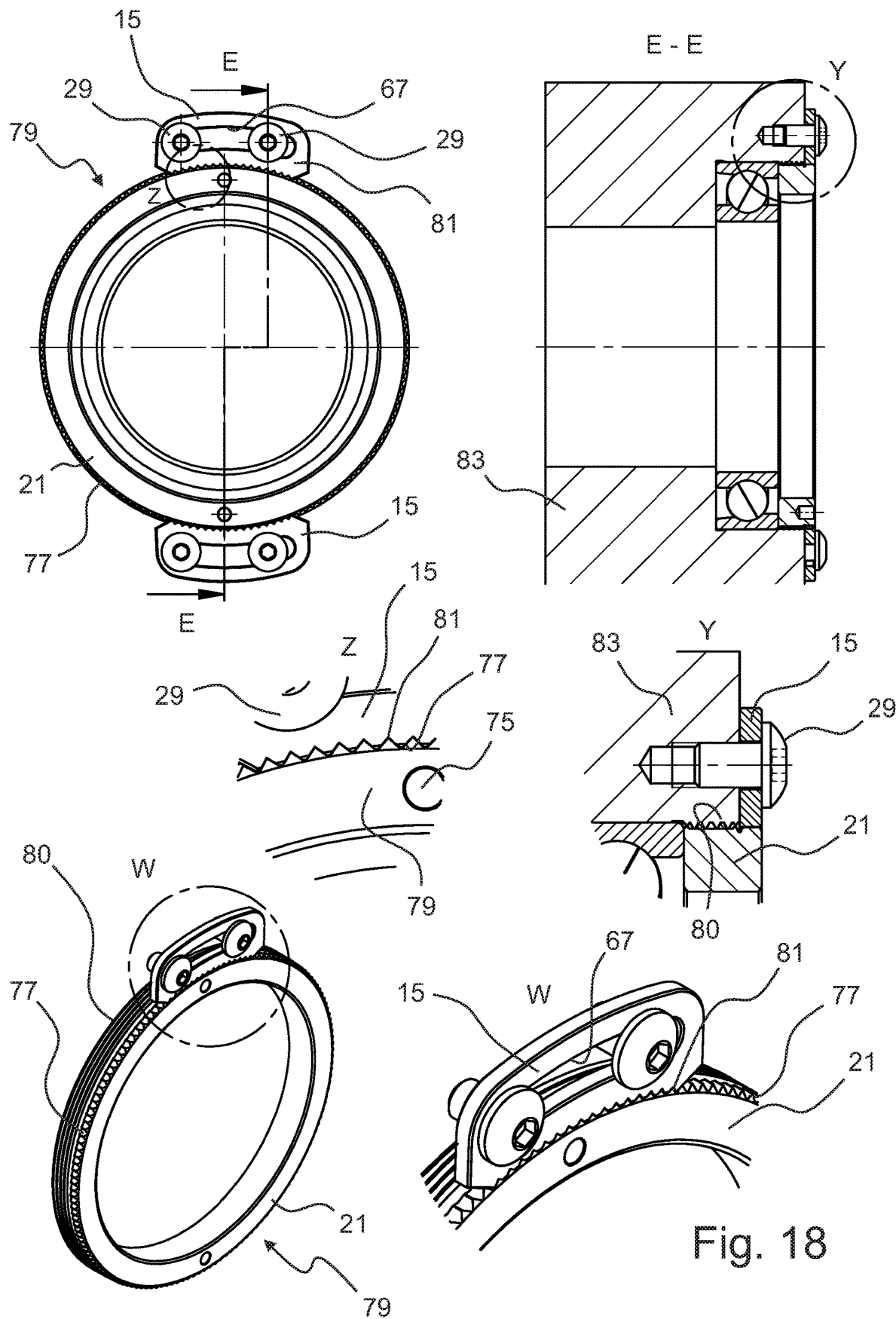

FIG. 18 shows a further exemplary embodiment using the example of a threaded ring 79 and a housing 83, in which the base body 21 of the adjusting element has a fine external toothing 77 on the outer diameter, which interacts with a complementarily shaped internal toothing 81 of the locking ring 15. An arc-shaped circumferential groove 67 is introduced into the locking ring 15, through which the clamping screws 29 can be screwed into a housing 83. The locking ring 15 is shown in multiple parts in FIG. 18; it can of course also be made in one piece and/or as a closed locking ring 15.

In this exemplary embodiment, the adjusting element is designed as a threaded ring 79 having an external thread 80. The anti-rotation lock must therefore be secured between the adjusting element and a housing 83 surrounding the adjusting element.

Figure 19:
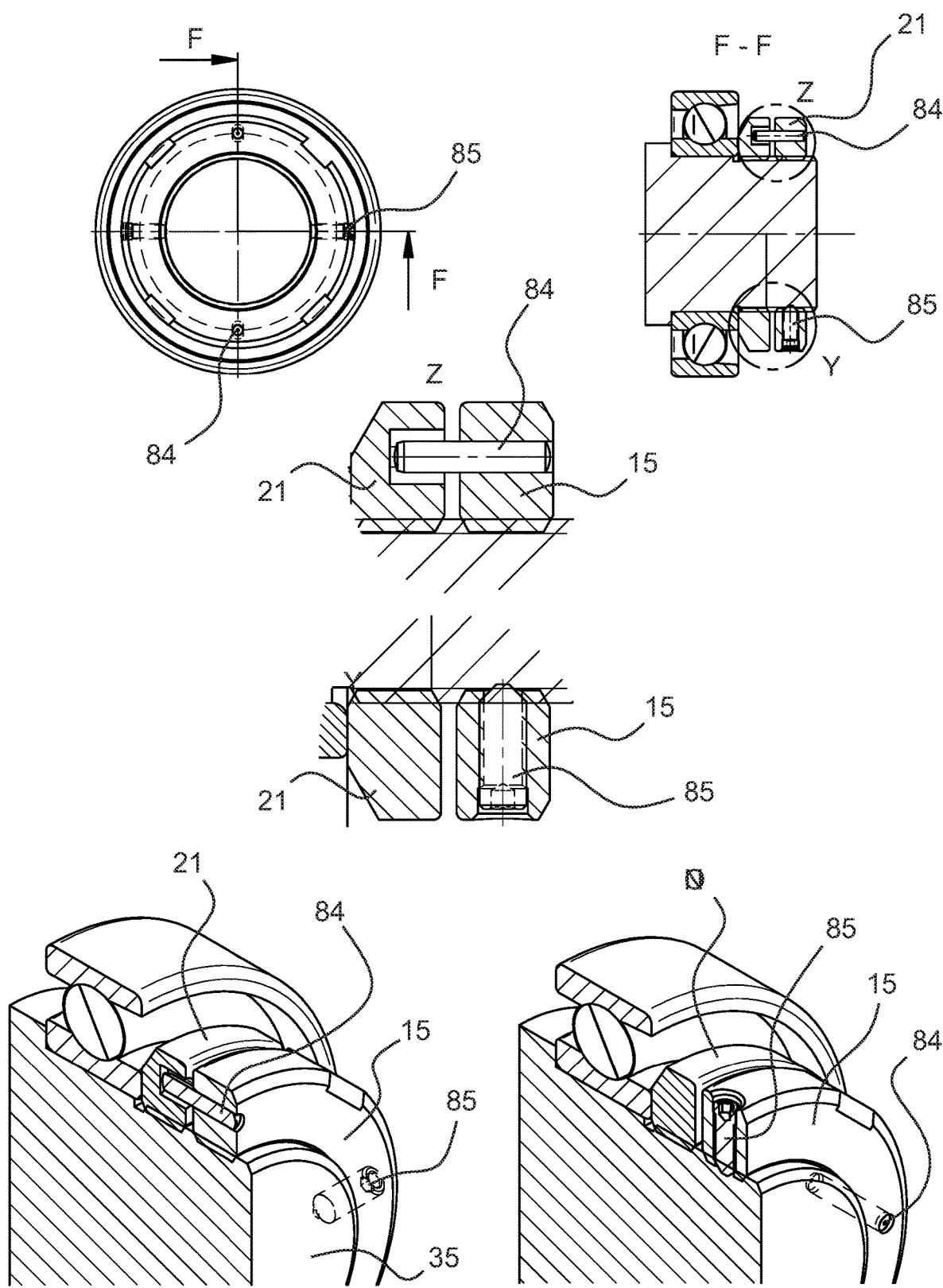

Another exemplary embodiment is shown in FIG. 19, in which the locking ring 15 also has an internal thread. Both are screwed onto the thread of the shaft 35. The base body 21 and the locking ring 15 are connected to one another via one or more positive locking elements. In FIG. 19, the positive locking elements are shown as pins 84 which are pressed into a bore of the locking ring 15. The base body 21 is used for the exact adjustment of the bearing 39, while the locking ring 15, which is connected to the base body 21 via the pins 84, provides the anti-rotation lock via, for example, radially arranged threaded pins 85. Of course, all possible thread locks, such as described in the patents mentioned, are conceivable here.

It is substantial in this embodiment that the locking ring and the base body do not exert any forces on one another during the securing process according to the invention.

In detail Z, it can be clearly seen that the pin 84 projects into a pocket 86 of the base body 21, which is longer in the radial direction than the diameter of the pin 84. In the tangential direction, the extent of the pocket 86 is equal to the diameter of the pin 84. The pins 84 couple the locking ring 15 and the locking ring 15 in such a way that a rotationally rigid connection is produced. On the other hand, the coupling in the radial and axial direction is so soft that it does not transfer the change in the position of the locking ring 15 relative to the shaft 35 that occurs when the threaded pins 85 are tightened onto the base body 21.

Instead of the internal thread on the locking ring 15, a simple cylindrical bore can also be present. The shaft 35 can then also have only a cylindrical portion instead of a thread in the region of the locking ring 15.

Figure 20A:
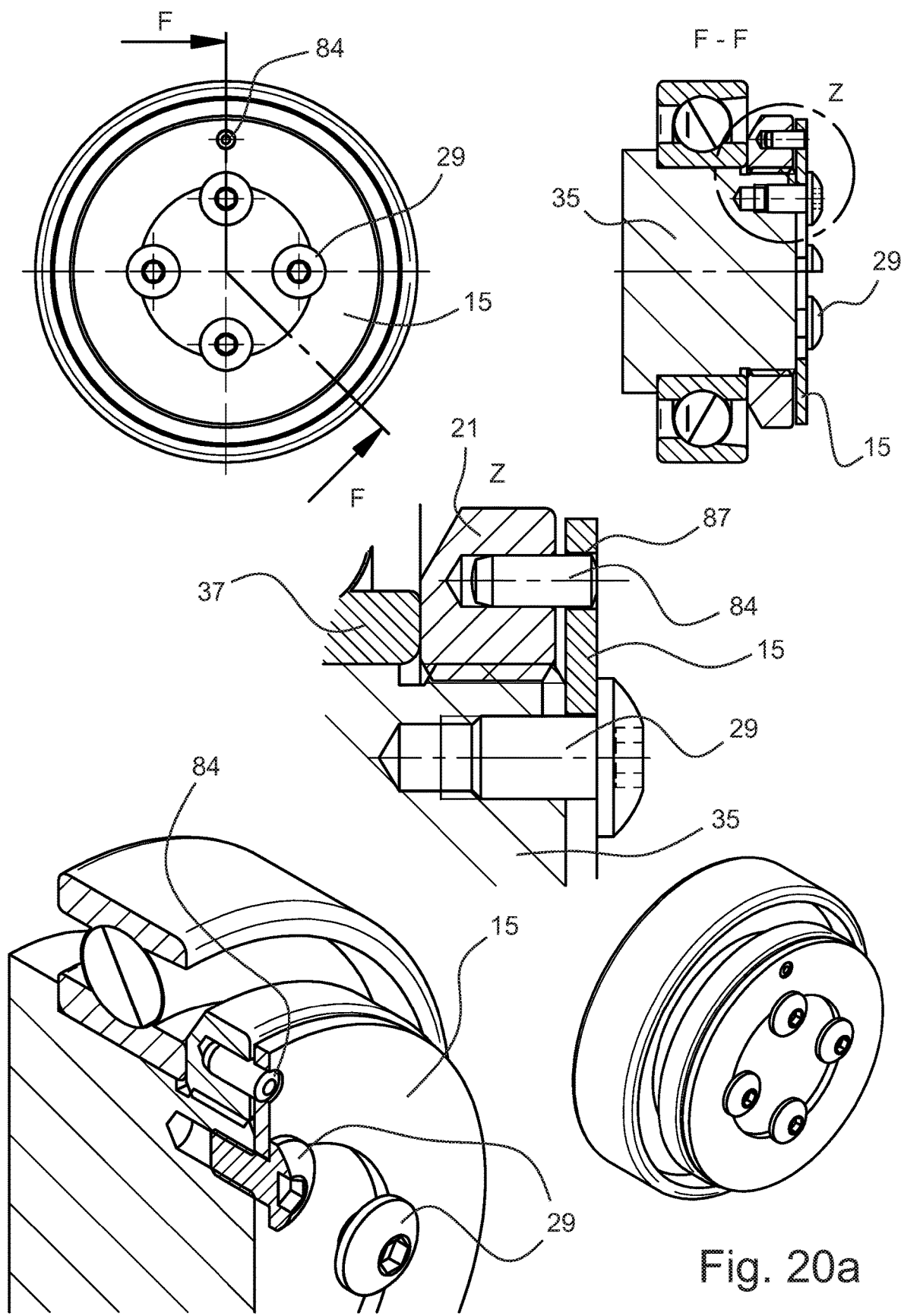

A further exemplary embodiment is shown in FIG. 20*a*, in which the locking ring 15 and the base body 21 are connected to one another in a rotationally fixed manner. The connection is made via a pin 84 which runs approximately parallel to the longitudinal axis of the shaft 35. The pin 84 can be pressed into the base body 21 and can be guided with slight clearance in a bore 87 in the locking ring 15.

In this exemplary embodiment, it is best to use only one pin 84 as a positive locking element. The clamping screws 29 are screwed into the shaft 35; there is a relatively large amount of "air" between the clamping screws 29 and the inner diameter of the locking ring 15, so that no radial forces are transmitted to the base body 21 via the clamping screws 29 and the locking ring 15. The axial forces that can be transmitted from the locking ring 15 to the base body 21 via the pin 84 are also so small that they cannot negatively influence the axial runout thereof.

Figure 20B:
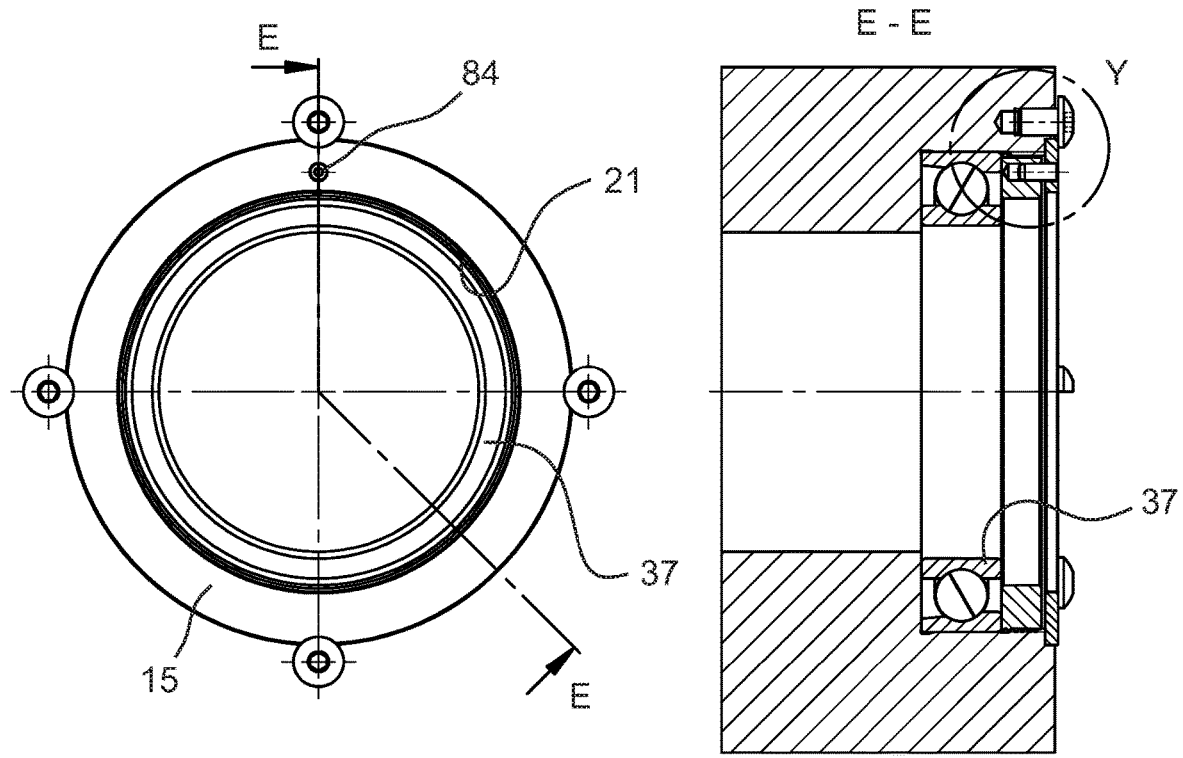
Figure 20B:
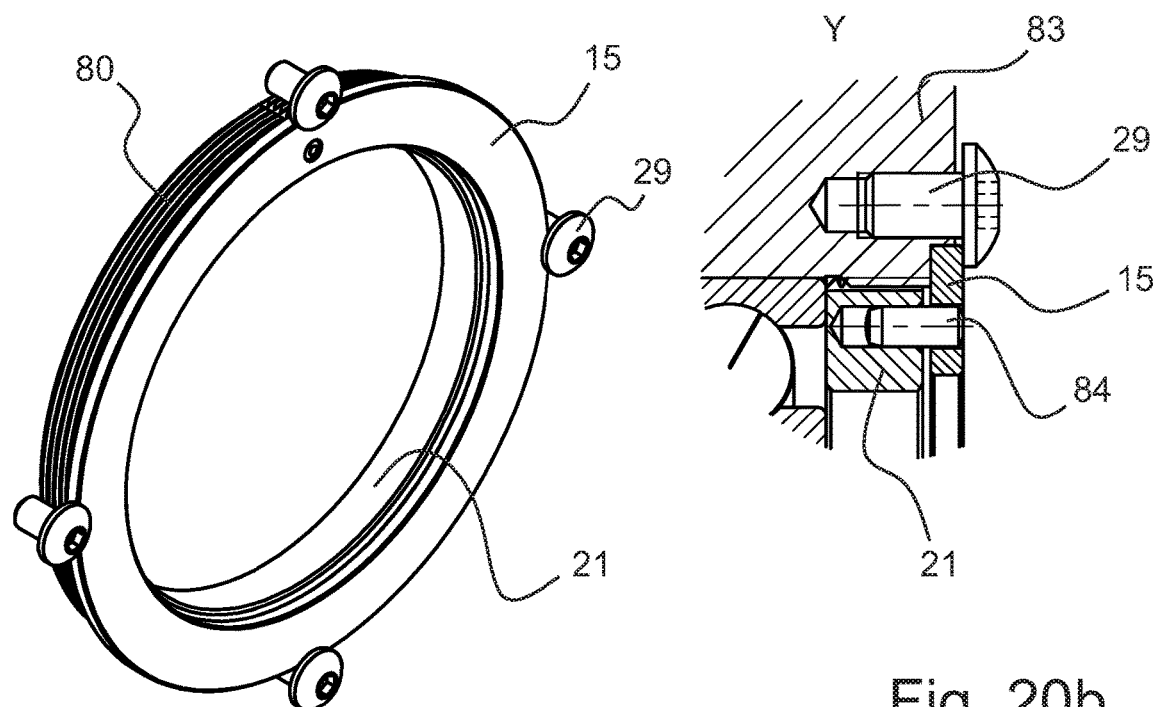

FIG. 20*b* shows an exemplary embodiment which functions in a similar way, but the adjusting element is designed as a threaded ring 79. The clamping screws 29 are screwed into the housing 83.

Figure 21:
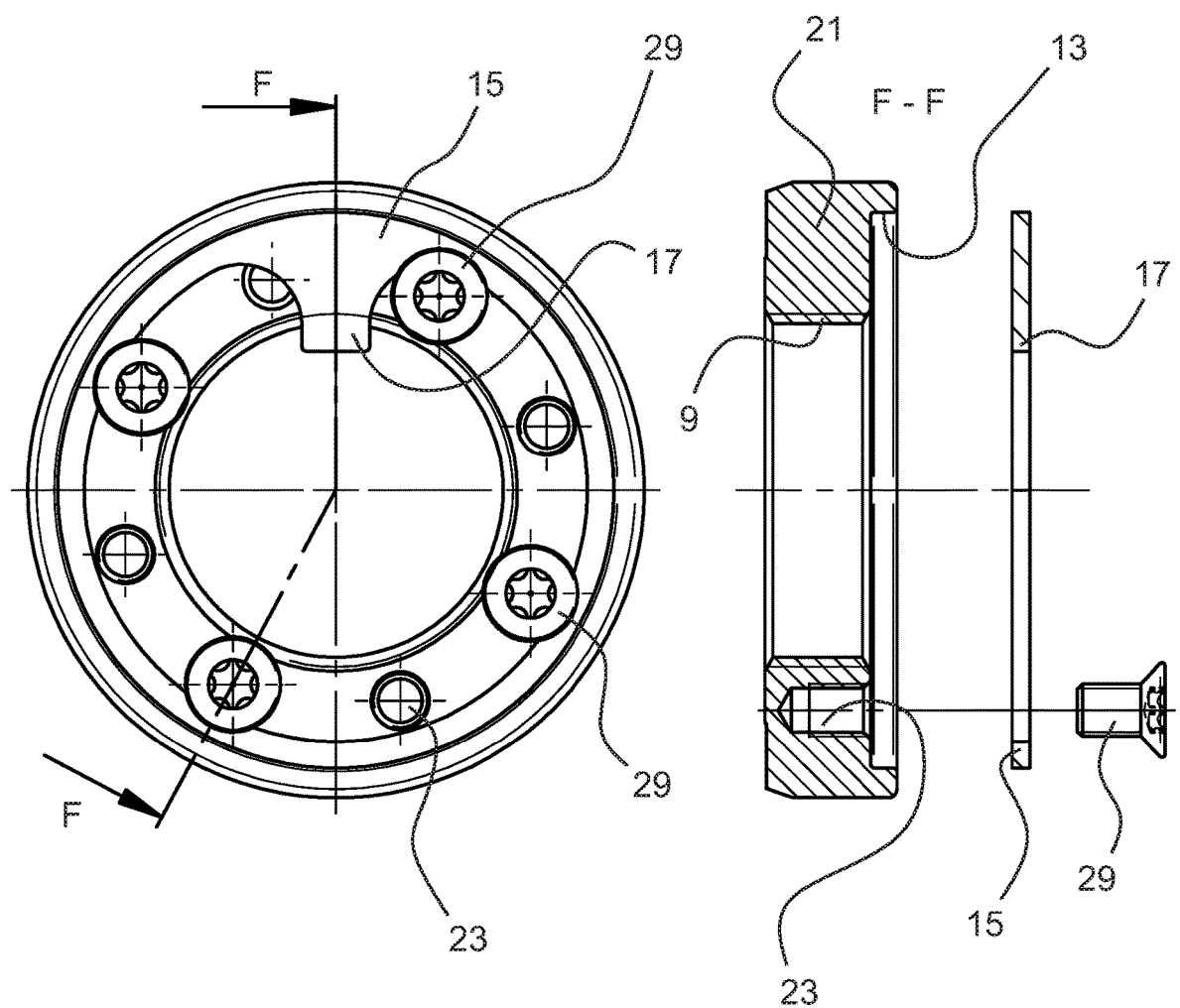

FIG. 21 shows a further exemplary embodiment in which the locking ring 15 is guided or centered on its outer diameter in a recess 13 in the base body 21. The clamping screws 29 sit in the inner region of the locking ring 15 and initially allow a partial rotation in the base body 21. Due to the additional threaded bores 23 in the base body 21, any positioning is nevertheless possible by using the free threaded bores 23 for the clamping.

Figure 22:
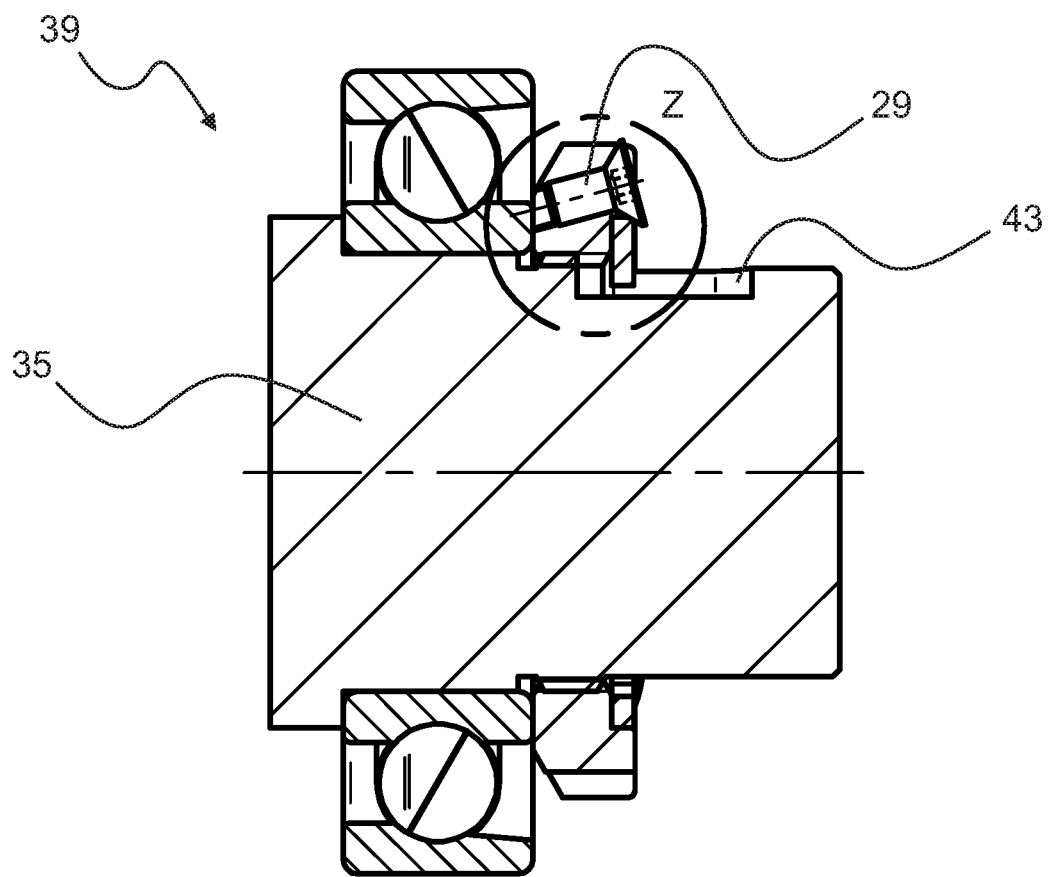
Figure 22:
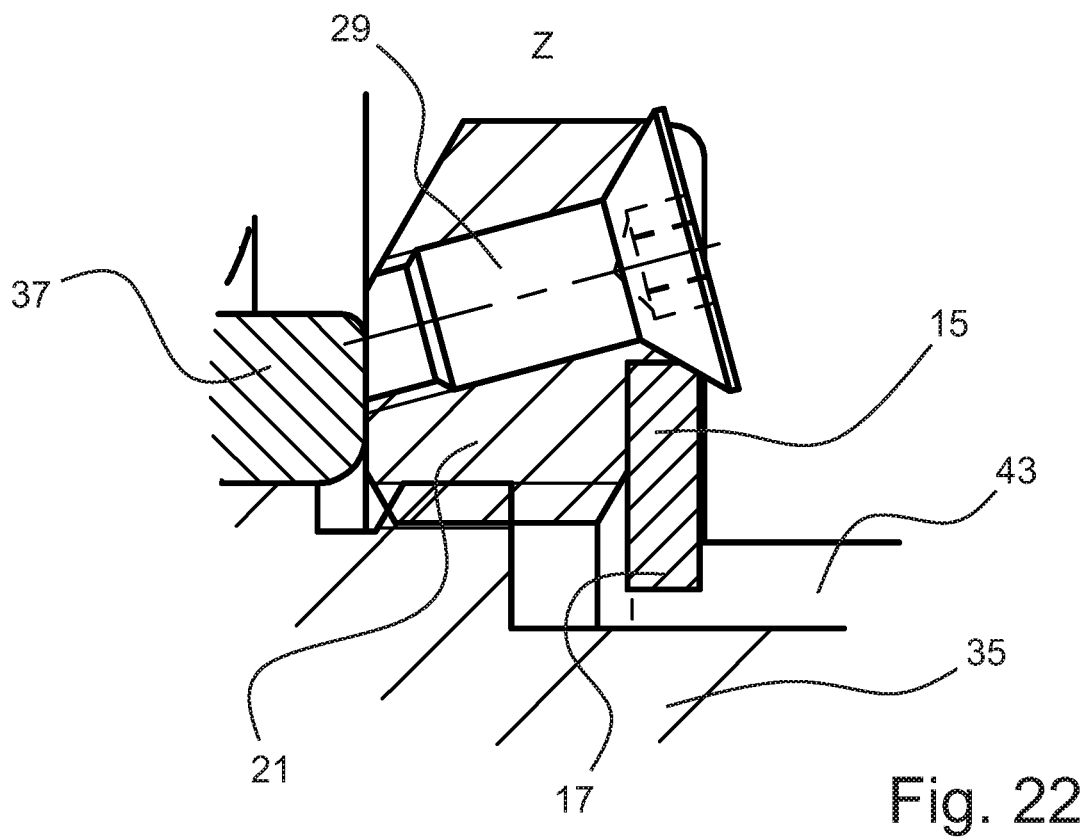

FIG. 22 shows an exemplary embodiment in which the clamping screws 29 are introduced at an angle to the longitudinal axis of the base body 21 in order to achieve better accessibility. In some applications, for example, if a larger gear sits in front of the clamping screw 29, the heads of axially parallel clamping screws 29 can then no longer be reached. The inclination of the clamping screws 29 can be 20°, 30°, or 45°, for example.

In conjunction with countersunk heads, the inclination of the clamping screws can also optimize the local deformation between the screw head and the locking ring 15.

Figure 23:
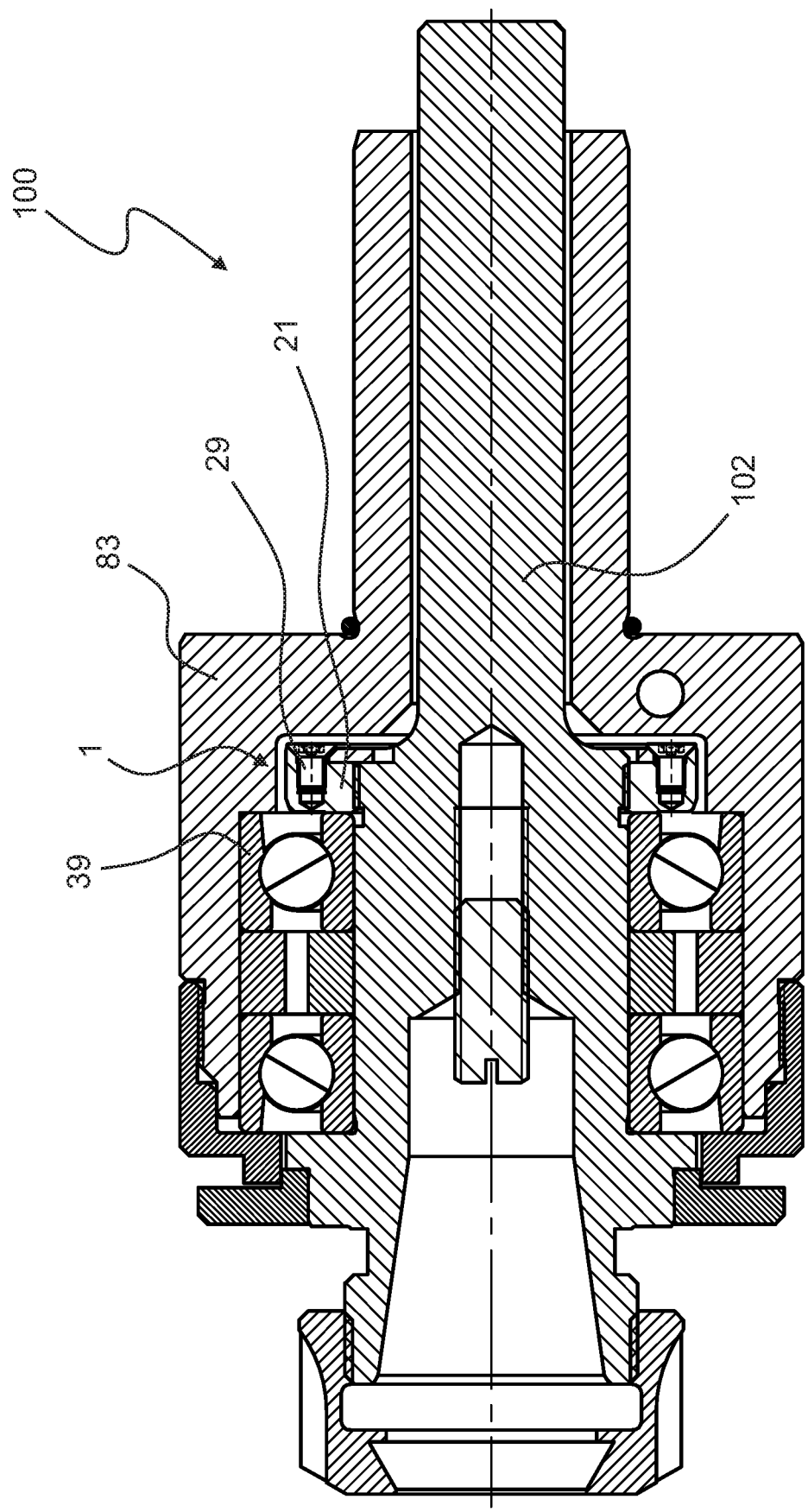

FIG. 23 shows a straight driven tool 100 having a housing 83 and a spindle 102 as an application example for the adjusting elements according to the invention.

The spindle 102 carries at the left end a tool holder for standard collets according to ISO 15488 and at the right end a coupling which is compatible with a drive of a machine tool (not shown). The spindle 102 is received in the housing 83 by two angular contact ball bearings and can rotate. The O-arrangement of the spindle bearing is held axially free of clearance and specifically preloaded by the adjusting element according to the invention, in this case a nut 1, and secured in the desired position by the locking ring 15 according to the invention with tabs 17. The details of the adjusting element according to the invention cannot be found in this figure. In this regard, reference is made to FIGS. 1 to 2.

If tapered roller bearings are used instead of angular contact ball bearings, then the axial clearance of the bearing can be adjusted sensitively and secured in the desired position.

The invention claimed is:

1. A multi-part adjusting element, comprising:
an annular base body;
a locking ring; and
at least one clamping element,
wherein the base body comprises a plane face and a thread,
wherein the adjusting element has means for producing a releasable non-positive connection between the locking ring and a shaft, or a housing, and
wherein the adjusting element has means for producing a positive connection between the locking ring and the base body.

2. A multi-part adjusting element, comprising:
an annular base body;
a locking ring; and
at least one clamping element,
wherein the base body comprises a plane face and a thread,
wherein the adjusting element has means for producing a positive connection between the locking ring and a shaft, a housing,
wherein the adjusting element has means for producing a releasable non-positive connection between the locking ring and the base body, and
wherein said means for producing the releasable non-positive connection between the locking ring and the base body is configurable to provide said at least one clamping element through a surface of said annular base body while not through any surface of said locking ring.

3. The multi-part adjusting element according to claim 2, wherein the means for producing a releasable non-positive connection between the base body and the locking ring comprise at least one clamping screw or at least one threaded pin and an internal thread cooperating therewith.

4. The multi-part adjusting element according to claim 3, wherein
a clamping plate is arranged on each clamping screw.

5. The multi-part adjusting element according to claim 4, wherein each clamping plate is positively secured against rotation.

6. The multi-part adjusting element according to claim 5, wherein the means for producing a positive connection comprise at least one tab on the locking ring.

7. The multi-part adjusting element according to claim 6, wherein the at least one tab extends radially inwards starting from the inner diameter of the locking ring or radially outwards starting from the outer diameter of the locking ring.

8. The multi-part adjusting element according to claim 7, wherein the at least one tab also extends in the axial direction.

9. The multi-part adjusting element according to claim 8, wherein the at least one tab has two parallel flanks or two wedge-shaped flanks.

10. The multi-part adjusting element according to claim 8, wherein the at least one tab has an opening and that the opening with a pin in the shaft or the housing forms a positive connection.

11. The multi-part adjusting element according to claim 10, wherein the locking ring is positively connected to the base body by means of teeth.

12. The multi-part adjusting element according to claim 10, wherein the locking ring is positively connected to the base body by one or more pins.

13. The multi-part adjusting element according to claim 12, wherein a recess for the locking ring is formed in an end face opposite to the plane face of the base body, and that the recess is arranged coaxially to the internal thread.

14. The multi-part adjusting element according to claim 13, wherein the locking ring has a cylindrical portion having at least one circumferential groove, and in that at least one clamping screw is screwed through the circumferential groove into the base body.

15. An adjusting element comprising:
a shaft; and
a housing,
wherein the shaft is rotatably mounted in the housing, and a clearance, the preload, or the position of at least one bearing in the housing or relative to the shaft can be adjusted or fixed using the multi-part adjusting element according to claim 14.

16. The multi-part adjusting element according to claim 15, wherein a longitudinal groove is formed in the shaft or the housing, and that the longitudinal groove together with the tab of the locking ring forms a clearance-free, between the locking ring and the shaft or the housing in the tangential direction.

17. The multi-part adjusting element according to claim 16, wherein the multi-part adjusting element is one part of or one element of a driven tool.

18. A driven tool comprising:
the multi-part adjusting element according to claim 16.

19. A multi-part adjusting element, comprising:
an annular base body having an inner annular base body circumference and an annular base body circumference;
a locking ring having an inner locking ring circumference and an outer locking ring circumference; and
at least one clamping element having a shaft,
wherein the base body comprises a plane face and a thread,
wherein the adjusting element has means for producing a positive connection between the locking ring and a shaft, or a housing,
wherein the adjusting element has means for producing a releasable non-positive connection between the locking ring and the base body, and
wherein said means for producing the releasable non-positive connection between the locking ring and the base body is configurable to provide said shaft of said at least one clamping element between said inner annular base body circumference and said annular base body circumference while said shaft of said at least one clamping element is configurable to not be provided between said inner locking ring circumference and said outer locking ring circumference of said locking ring.

* * * * *